US007862423B2

(12) United States Patent
Walker et al.

(10) Patent No.: US 7,862,423 B2

(45) Date of Patent: *Jan. 4, 2011

(54) METHODS AND APPARATUS FOR REPRESENTING PLAY IN A REVERSE MODE

(75) Inventors: Jay S. Walker, Ridgefield, CT (US); James A. Jorasch, Stamford, CT (US); Victor M. Garcia, New Haven, CT (US); Daniel E. Tedesco, Huntington, CT (US); Stephen C. Tulley, Fairfield, CT (US); Geoffrey M. Gelman, Stamford, CT (US)

(73) Assignee: IGT, Reno, NV (US)

(*) Notice: Subject to any disclaimer, the term of this patent is extended or adjusted under 35 U.S.C. 154(b) by 134 days.

This patent is subject to a terminal disclaimer.

(21) Appl. No.: 12/269,129

(22) Filed: Nov. 12, 2008 (Under 37 CFR 1.47)

(65) Prior Publication Data

US 2009/0082090 A1 Mar. 26, 2009

Related U.S. Application Data

(63) Continuation of application No. 10/788,124, filed on Feb. 26, 2004, now Pat. No. 7,452,272, which is a continuation-in-part of application No. 10/420,037, filed on Apr. 21, 2003, now abandoned.

(60) Provisional application No. 60/452,003, filed on Mar. 4, 2003, provisional application No. 60/374,384, filed on Apr. 19, 2002.

(51) Int. Cl.
*A63F 9/24* (2006.01)
*A63F 13/00* (2006.01)

(52) U.S. Cl. .......................................... 463/20; 463/16

(58) Field of Classification Search .................. 463/12, 463/16, 20–25, 35, 40–42, 13; 725/22; 273/138.1, 273/143 R, 139; 705/14.5
See application file for complete search history.

(56) References Cited

U.S. PATENT DOCUMENTS 3,810,627 A 5/1974 Levy
4,339,798 A 7/1982 Hedges et al.

(Continued)

FOREIGN PATENT DOCUMENTS

AU 200139027 8/2010

OTHER PUBLICATIONS

Bots Game Description printed from http://en.wikipedia.org/wiki/BOTS on Aug. 27, 2010.

(Continued)

*Primary Examiner*—Peter DungBa Vo
*Assistant Examiner*—Masud Ahmed
(74) *Attorney, Agent, or Firm*—K&L Gates LLP

(57) ABSTRACT

In accordance with one or more embodiments, a method for facilitating play of a gaming device is presented, in which the method comprises enabling a reverse payout mode of play of the gaming device and displaying an indication that play of the gaming device is to be provided in accordance with the reverse payout mode of play. In some embodiments, the indication may include a representation of a virtual player playing in a normal mode of play.

4 Claims, 35 Drawing Sheets

U.S. PATENT DOCUMENTS

| | | | | |
|---|---|---|---|---|
| 4,669,731 | A | 6/1987 | Clarke | |
| 4,991,848 | A | 2/1991 | Greenwood et al. | |
| 5,178,390 | A | 1/1993 | Okada | |
| 5,669,606 | A | 9/1997 | Brown | |
| 5,752,881 | A | 5/1998 | Inoue | |
| 5,770,533 | A | 6/1998 | Franchi | |
| 6,056,642 | A | 5/2000 | Bennett | |
| 6,068,552 | A | 5/2000 | Walker et al. | |
| 6,113,492 | A * | 9/2000 | Walker et al. | 463/16 |
| 6,155,925 | A | 12/2000 | Giobbi et al. | |
| 6,165,069 | A * | 12/2000 | Sines et al. | 463/12 |
| 6,511,375 | B1 | 1/2003 | Kaminkow | |
| 6,517,433 | B2 | 2/2003 | Loose et al. | |
| 6,517,437 | B1 | 2/2003 | Wells et al. | |
| 6,537,152 | B2 | 3/2003 | Seelig et al. | |
| 6,607,437 | B2 * | 8/2003 | Casey et al. | 463/16 |
| 6,712,702 | B2 * | 3/2004 | Goldberg et al. | 463/42 |
| 6,749,501 | B2 * | 6/2004 | Crawford | 463/13 |
| 6,837,793 | B2 | 1/2005 | McClintic | |
| 7,048,629 | B2 * | 5/2006 | Sines et al. | 463/16 |
| 7,309,065 | B2 | 12/2007 | Yoseloff et al. | |
| 7,496,943 | B1 * | 2/2009 | Goldberg et al. | 725/22 |
| 7,748,714 | B2 | 7/2010 | Nicely et al. | |
| 2003/0114218 | A1 * | 6/2003 | McClintic | 463/25 |
| 2004/0198481 | A1 * | 10/2004 | Herrington et al. | 463/13 |
| 2004/0219969 | A1 | 11/2004 | Walker et al. | |
| 2005/0181866 | A1 | 8/2005 | Baerlocher | |
| 2007/0082725 | A1 | 4/2007 | Low et al. | |
| 2008/0108401 | A1 | 5/2008 | Baerlocher et al. | |

OTHER PUBLICATIONS

"International Gaming & Wagering Business (IGWB)", Apr. 1996, vol. 17, No. 4, pp. 2.36.

Office Action for U.S. Appl. No. 10/420,037, dated Sep. 5, 2006, 6 pp.

Office Action for U.S. Appl. No. 10/420,037, dated Feb. 28, 2007, 7 pp.

Office Action for U.S. Appl. No. 10/420,037, dated Apr. 17, 2007, 3 pp.

* cited by examiner

128A

| RANDOM NUMBER 230 | REEL 1 232 | REEL 2 234 | REEL 3 236 | PAY COMBINATION 238 | NUMBER OF COINS AWARDED 240 | PLAYER WIN / LOSS 242 |
|---|---|---|---|---|---|---|
| 00001 | 7 | 7 | 7 | 7 / 7 / 7 | 100 | 99 |
| 00002 | 7 | 7 | BAR | OTHER | 0 | -1 |
| 00003 | 7 | 7 | CHERRY | ANY / ANY / CHERRY | 2 | 1 |
| 00004 | 7 | 7 | ORANGE | OTHER | 0 | -1 |
| 00005 | 7 | BAR | BAR | OTHER | 0 | -1 |
| 00006 | 7 | BAR | CHERRY | ANY / ANY / CHERRY | 2 | 1 |
| ⋮ | ⋮ | ⋮ | ⋮ | ⋮ | ⋮ | ⋮ |
| 00112 | BAR | BAR | BAR | BAR / BAR / BAR | 50 | 49 |
| 00113 | BAR | BELL | BELL | OTHER | 0 | -1 |
| 00114 | BAR | BELL | CHERRY | ANY / ANY / CHERRY | 2 | 1 |
| 00115 | BAR | BELL | ORANGE | OTHER | 0 | -1 |
| 00116 | BAR | BELL | PLUM | OTHER | 0 | -1 |
| 00117 | BAR | PLUM | PLUM | BAR / PLUM / PLUM | 14 | 13 |
| ⋮ | ⋮ | ⋮ | ⋮ | ⋮ | ⋮ | ⋮ |
| 03456 | BELL | BELL | BELL | BELL / BELL / BELL | 20 | 19 |
| 03457 | BELL | BELL | CHERRY | ANY / ANY / CHERRY | 2 | 1 |
| 03458 | BELL | BELL | ORANGE | OTHER | 0 | -1 |
| 03459 | BELL | BELL | PLUM | OTHER | 0 | -1 |
| ⋮ | ⋮ | ⋮ | ⋮ | ⋮ | ⋮ | ⋮ |
| 10647 | ORANGE | ORANGE | ORANGE | ORANGE / ORANGE / ORANGE | 20 | 19 |
| 10648 | ORANGE | ORANGE | BAR | ORANGE / ORANGE / BAR | 10 | 9 |

FIG. 2A

128B

| PAY COMBINATION 210 | NUMBER OF COINS AWARDED 212 | EXPECTED HITS 214 | PLAYER WIN/LOSS 216 | EXPECTED HITS (X) WIN/LOSS 218 |
|---|---|---|---|---|
| CHERRY / ANY / ANY | 2 | 680 | 1 | 680 |
| ANY / ANY / CHERRY | 2 | 680 | 1 | 680 |
| CHERRY / CHERRY / ANY | 5 | 200 | 4 | 800 |
| ANY / CHERRY / CHERRY | 5 | 200 | 4 | 800 |
| CHERRY / ANY / CHERRY | 5 | 68 | 4 | 272 |
| CHERRY / CHERRY / CHERRY | 20 | 20 | 19 | 380 |
| BAR / ORANGE / ORANGE | 10 | 42 | 9 | 378 |
| ORANGE / ORANGE / BAR | 10 | 6 | 9 | 54 |
| ORANGE / ORANGE / ORANGE | 20 | 42 | 19 | 798 |
| BAR / PLUM / PLUM | 14 | 20 | 13 | 260 |
| PLUM / PLUM / BAR | 14 | 5 | 13 | 65 |
| PLUM / PLUM / PLUM | 20 | 50 | 19 | 950 |
| BAR / BELL / BELL | 18 | 4 | 17 | 68 |
| BELL / BELL / BAR | 18 | 20 | 17 | 340 |
| BELL / BELL / BELL | 20 | 20 | 19 | 380 |
| BAR / BAR / BAR | 50 | 20 | 49 | 980 |
| 7 / 7 / 7 | 100 | 1 | 99 | 99 |
| OTHER | 0 | 8,570 | -1 | -8,570 |

FIG. 2B

128C

| PAY COMBINATION 220 | NUMBER OF COINS AWARDED 222 | EXPECTED HITS 224 | PLAYER WIN / LOSS 226 | EXPECTED HITS (X) WIN / LOSS 228 |
|---|---|---|---|---|
| CHERRY / ANY / ANY | 1 | 680 | 1 | 680 |
| ANY / ANY / CHERRY | 1 | 680 | 1 | 680 |
| CHERRY / CHERRY / ANY | 4 | 200 | 4 | 800 |
| ANY / CHERRY / CHERRY | 4 | 200 | 4 | 800 |
| CHERRY / ANY / CHERRY | 4 | 68 | 4 | 272 |
| CHERRY / CHERRY / CHERRY | 19 | 20 | 19 | 380 |
| BAR / ORANGE / ORANGE | 9 | 42 | 9 | 378 |
| ORANGE / ORANGE / BAR | 9 | 6 | 9 | 54 |
| ORANGE /ORANGE / ORANGE | 19 | 42 | 19 | 798 |
| BAR / PLUM / PLUM | 13 | 20 | 13 | 260 |
| PLUM / PLUM / BAR | 13 | 5 | 13 | 65 |
| PLUM / PLUM / PLUM | 19 | 50 | 19 | 950 |
| BAR / BELL / BELL | 17 | 4 | 17 | 68 |
| BELL / BELL / BAR | 17 | 20 | 17 | 340 |
| BELL / BELL / BELL | 19 | 20 | 19 | 380 |
| BAR / BAR / BAR | 49 | 20 | 49 | 980 |
| 7 / 7 / 7 | 99 | 1 | 99 | 99 |
| OTHER | -1 | 8,570 | -1 | -8,570 |

FIG. 2C

146A

| PAY COMBINATION 310 | NUMBER OF COINS AWARDED 312 | EXPECTED HITS 314 | PLAYER WIN / LOSS 316 | EXPECTED HITS (X) WIN / LOSS 318 |
|---|---|---|---|---|
| CHERRY / ANY / ANY | 0 | 680 | -1 | -680 |
| ANY / ANY / CHERRY | 0 | 680 | -1 | -680 |
| CHERRY / CHERRY / ANY | 0 | 200 | -4 | -800 |
| ANY / CHERRY / CHERRY | 0 | 200 | -4 | -800 |
| CHERRY / ANY / CHERRY | 0 | 68 | -4 | -272 |
| CHERRY / CHERRY / CHERRY | 0 | 20 | -19 | -380 |
| BAR / ORANGE / ORANGE | 0 | 42 | -9 | -378 |
| ORANGE / ORANGE / BAR | 0 | 6 | -9 | -54 |
| ORANGE /ORANGE / ORANGE | 0 | 42 | -19 | -798 |
| BAR / PLUM / PLUM | 0 | 20 | -13 | -260 |
| PLUM / PLUM / BAR | 0 | 5 | -13 | -65 |
| PLUM / PLUM / PLUM | 0 | 50 | -19 | -950 |
| BAR / BELL / BELL | 0 | 4 | -17 | -68 |
| BELL / BELL / BAR | 0 | 20 | -17 | -340 |
| BELL / BELL / BELL | 0 | 20 | -19 | -380 |
| BAR / BAR / BAR | 0 | 20 | -49 | -980 |
| 7 / 7 / 7 | 0 | 1 | -99 | -99 |
| OTHER | 1 | 8,570 | -1 | 8,570 |

FIG. 3A

146B

| PAY COMBINATION 320 | NUMBER OF COINS AWARDED 322 | EXPECTED HITS 324 | PLAYER WIN / LOSS 326 | EXPECTED HITS (X) WIN / LOSS 328 |
|---|---|---|---|---|
| CHERRY / ANY / ANY | 98 | 680 | -1 | -680 |
| ANY / ANY / CHERRY | 98 | 680 | -1 | -680 |
| CHERRY / CHERRY / ANY | 95 | 200 | -4 | -800 |
| ANY / CHERRY / CHERRY | 95 | 200 | -4 | -800 |
| CHERRY / ANY / CHERRY | 95 | 68 | -4 | -272 |
| CHERRY / CHERRY / CHERRY | 80 | 20 | -19 | -380 |
| BAR / ORANGE / ORANGE | 90 | 42 | -9 | -378 |
| ORANGE / ORANGE / BAR | 90 | 6 | -9 | -54 |
| ORANGE /ORANGE / ORANGE | 80 | 42 | -19 | -798 |
| BAR / PLUM / PLUM | 86 | 20 | -13 | -260 |
| PLUM / PLUM / BAR | 86 | 5 | -13 | -65 |
| PLUM / PLUM / PLUM | 82 | 50 | -19 | -950 |
| BAR / BELL / BELL | 82 | 4 | -17 | -68 |
| BELL / BELL / BAR | 82 | 20 | -17 | -340 |
| BELL / BELL / BELL | 80 | 20 | -19 | -380 |
| BAR / BAR / BAR | 50 | 20 | -49 | -980 |
| 7 / 7 / 7 | 0 | 1 | -99 | -99 |
| OTHER | 100 | 8,570 | 1 | 8,570 |

FIG. 3B

146C

| PAY COMBINATION 330 | NUMBER OF COINS AWARDED 332 | EXPECTED HITS 334 | PLAYER WIN / LOSS 336 | EXPECTED HITS (X) WIN / LOSS 338 |
|---|---|---|---|---|
| CHERRY / ANY / ANY | 0 | 680 | -5 | -3,400 |
| ANY / ANY / CHERRY | 0 | 680 | -5 | -3,400 |
| CHERRY / CHERRY / ANY | 0 | 200 | -5 | -1,000 |
| ANY / CHERRY / CHERRY | 0 | 200 | -5 | -1,000 |
| CHERRY / ANY / CHERRY | 0 | 68 | -5 | -340 |
| CHERRY / CHERRY / CHERRY | 0 | 20 | -5 | -100 |
| BAR / ORANGE / ORANGE | 0 | 42 | -5 | -210 |
| ORANGE / ORANGE / BAR | 0 | 6 | -5 | -30 |
| ORANGE /ORANGE / ORANGE | 0 | 42 | -5 | -210 |
| BAR / PLUM / PLUM | 0 | 20 | -5 | -100 |
| PLUM / PLUM / BAR | 0 | 5 | -5 | -25 |
| PLUM / PLUM / PLUM | 0 | 50 | -5 | -250 |
| BAR / BELL / BELL | 0 | 4 | -5 | -20 |
| BELL / BELL / BAR | 0 | 20 | -5 | -100 |
| BELL / BELL / BELL | 0 | 20 | -5 | -100 |
| BAR / BAR / BAR | 0 | 20 | -5 | -100 |
| 7 / 7 / 7 | 0 | 1 | -5 | -5 |
| OTHER | 6 | 8,570 | 1 | 8,570 |

FIG. 3C

146D

| PAY COMBINATION 340 | NUMBER OF COINS AWARDED 342 | EXPECTED HITS 344 | PLAYER WIN / LOSS 346 | EXPECTED HITS (X) WIN / LOSS 348 |
|---|---|---|---|---|
| CHERRY / ANY / ANY | 0 | 680 | -5 | -3,400 |
| ANY / ANY / CHERRY | 0 | 680 | -5 | -3,400 |
| CHERRY / CHERRY / ANY | 0 | 200 | -5 | -1,000 |
| ANY / CHERRY / CHERRY | 0 | 200 | -5 | -1,000 |
| CHERRY / ANY / CHERRY | 0 | 68 | -5 | -340 |
| CHERRY / CHERRY / CHERRY | 0 | 20 | -5 | -100 |
| BAR / ORANGE / ORANGE | 0 | 42 | -5 | -210 |
| ORANGE / ORANGE / BAR | 0 | 6 | -5 | -30 |
| ORANGE /ORANGE / ORANGE | 0 | 42 | -5 | -210 |
| BAR / PLUM / PLUM | 0 | 20 | -5 | -100 |
| PLUM / PLUM / BAR | 0 | 5 | -5 | -25 |
| PLUM / PLUM / PLUM | 0 | 50 | -5 | -250 |
| BAR / BELL / BELL | 0 | 4 | -5 | -20 |
| BELL / BELL / BAR | 0 | 20 | -5 | -100 |
| BELL / BELL / BELL | 0 | 20 | -5 | -100 |
| BAR / BAR / BAR | 0 | 20 | -5 | -100 |
| 7 / 7 / 7 | 0 | 1 | -5 | -5 |
| OTHER | 1 | 8,570 | 1 | 8,570 |

FIG. 3D

ALL PAYS ON CENTER LINE

744

| NAME 7440 | PLAYER ID NUMBER 7442 | ADDRESS 7443 | CREDIT CARD NUMBER 7445 | CREDIT BALANCE 7446 | COMP. INFO 7447 | PLAYER STATUS RATING 7449 |
|---|---|---|---|---|---|---|
| JOHN SMITH | 276948 | 125 MAIN ST. STAMFORD, CT | 1111-2222-3333-4444 | $100.00 | N / A | HIGH ROLLER |
| HELEN ADAMS | 285457 | 33 STATE ST. WATERBURY, CT | 9999-8888-7777-6666 | $25.00 | NONE | NOVICE |
| CHRIS SMITH | 354496 | 44 OCEAN DR. ATLANTIC CITY, NJ | 2222-4444-6666-8888 | $65.00 | N / A | HIGH ROLLER |

FIG. 8

749

| MACHINE ID NUMBER 7491 | PLAYER ID NUMBER 7492 | WIN / LOSS 7494 | AMOUNT WAGERED 7497 | PAYOUT MODE 7498 | PAYOUT TABLE IDENTIFIER 7499 |
|---|---|---|---|---|---|
| 423 | 276948 | +1 | 5 | REVERSE | RAM |
| 424 | 294623 | -5 | 5 | REVERSE | DSD 1-1 |
| 425 | 287654 | +5 | 5 | REVERSE | DSD 1-1 |

FIG. 9

1300

| PAY COMBINATION 1310 | NUMBER OF COINS AWARDED 1320 | EXPECTED HITS 1330 | PLAYER WIN / LOSS 1340 | EXPECTED HITS (X) WIN / LOSS 1350 |
|---|---|---|---|---|
| CHERRY / ANY / ANY | 0 | 680 | -1 | -680 |
| ANY / ANY / CHERRY | 0 | 680 | -1 | -680 |
| CHERRY / CHERRY / ANY | 0 | 200 | -4 | -800 |
| ANY / CHERRY / CHERRY | 0 | 200 | -4 | -800 |
| CHERRY / ANY / CHERRY | 0 | 68 | -4 | -272 |
| CHERRY / CHERRY / CHERRY | 0 | 20 | -19 | -380 |
| BAR / ORANGE / ORANGE | 0 | 42 | -9 | -378 |
| ORANGE / ORANGE / BAR | 0 | 6 | -9 | -54 |
| ORANGE /ORANGE / ORANGE | 0 | 42 | -19 | -798 |
| BAR / PLUM / PLUM | 0 | 20 | -13 | -260 |
| PLUM / PLUM / BAR | 0 | 5 | -13 | -65 |
| PLUM / PLUM / PLUM | 0 | 50 | -19 | -950 |
| BAR / BELL / BELL | 0 | 4 | -17 | -68 |
| BELL / BELL / BAR | 0 | 20 | -17 | -340 |
| BELL / BELL / BELL | 0 | 20 | -19 | -380 |
| BAR / BAR / BAR | 0 | 20 | -49 | -980 |
| 7 / 7 / 7 | 99 | 1 | 99 | 99 |
| OTHER | 1 | 8,570 | 1 | 8,570 |

FIG. 13A

1300B

| PAY COMBINATION 1360 | NUMBER OF COINS AWARDED 1370 | EXPECTED HITS 1380 | PLAYER WIN / LOSS 1390 | EXPECTED HITS (X) WIN / LOSS 1395 |
|---|---|---|---|---|
| CHERRY / ANY / ANY | 98 | 680 | -1 | -680 |
| ANY / ANY / CHERRY | 98 | 680 | -1 | -680 |
| CHERRY / CHERRY / ANY | 95 | 200 | -4 | -800 |
| ANY / CHERRY / CHERRY | 95 | 200 | -4 | -800 |
| CHERRY / ANY / CHERRY | 95 | 68 | -4 | -272 |
| CHERRY / CHERRY / CHERRY | 80 | 20 | -19 | -380 |
| BAR / ORANGE / ORANGE | 90 | 42 | -9 | -378 |
| ORANGE / ORANGE / BAR | 90 | 6 | -9 | -54 |
| ORANGE /ORANGE / ORANGE | 80 | 42 | -19 | -798 |
| BAR / PLUM / PLUM | 86 | 20 | -13 | -260 |
| PLUM / PLUM / BAR | 86 | 5 | -13 | -65 |
| PLUM / PLUM / PLUM | 80 | 50 | -19 | -950 |
| BAR / BELL / BELL | 82 | 4 | -17 | -68 |
| BELL / BELL / BAR | 82 | 20 | -17 | -340 |
| BELL / BELL / BELL | 80 | 20 | -19 | -380 |
| BAR / BAR / BAR | 50 | 20 | -49 | -980 |
| 7 / 7 / 7 | 198 | 1 | 99 | -99 |
| OTHER | 100 | 8,570 | 1 | 8,570 |

FIG. 13B

400

| POSSIBLE FINAL HANDS | PAYOUT |
|---|---|
| ROYAL FLUSH | $800 |
| STRAIGHT FLUSH | $50 |
| FOUR OF A KIND | $25 |
| FULL HOUSE | $9 |
| FLUSH | $6 |
| STRAIGHT | $4 |
| THREE OF A KIND | $3 |
| TWO PAIR | $2 |
| PAIR JACKS OR BETTER | $1 |
| TENS OR LOWER | $0 |

FIG. 14

401

| POSSIBLE FINAL HANDS | PAYOUT |
| --- | --- |
| ROYAL FLUSH | $0 |
| STRAIGHT FLUSH | $0 |
| FOUR OF A KIND | $0 |
| FULL HOUSE | $0 |
| FLUSH | $0 |
| STRAIGHT | $0 |
| THREE OF A KIND | $0 |
| TWO PAIR | $0 |
| PAIR JACKS OR BETTER | $0 |
| TENS OR LOWER | $6 |

FIG. 15A

401

| POSSIBLE FINAL HANDS | PAYOUT |
|---|---|
| 5 - 4 - 3 - 2 - A | $100 |
| 6 - 4 - 3 - 2 - A | $50 |
| 7 HIGH | $20 |
| 8 HIGH | $5 |
| 9 HIGH | $2 |
| ALL OTHER HANDS | $0 |

FIG. 15B

METHODS AND APPARATUS FOR REPRESENTING PLAY IN A REVERSE MODE

The present application is a continuation application of U.S. patent application Ser. No. 10/788,124, filed Feb. 26, 2004 now U.S. Pat. No. 7,452,272, entitled "METHODS AND APPARATUS FOR REPRESENTING PLAY IN A REVERSE MODE", which application (i) claims the benefit of U.S. Provisional Patent Application Ser. No. 60/452,003, filed Mar. 4, 2003, entitled "SYSTEMS AND METHODS FOR FACILITATING PLAY OF GAMING DEVICES USING REVERSED PAYOUT TABLES"; and (ii) is a continuation-in-part of U.S. patent application Ser. No. 10/420,037, filed Apr. 21, 2003 now abandoned, entitled "SYSTEMS AND METHODS FOR FACILITATING PLAY USING REVERSED PAYOUT TABLES"; which claims the benefit of U.S. Provisional Patent Application Ser. No. 60/374,384, filed Apr. 19, 2002, entitled "GAMING DEVICE METHODS AND APPARATUS EMPLOYING REVERSED PAYOUT TABLES."

The entirety of each of the Applications above is incorporated by reference herein for all purposes.

CROSS-REFERENCE TO RELATED U.S. APPLICATIONS

The present Application is related to commonly-owned, co-pending U.S. Reissue application Ser. No. 10/222,523, filed Aug. 16, 2002, entitled "A GAMING DEVICE FOR OPERATING IN A REVERSE PAYOUT MODE AND A METHOD OF OPERATING SAME," the entirety of which is incorporated by reference herein for all purposes.

FIELD OF THE INVENTION

The present invention relates generally to operation of gaming devices.

BACKGROUND OF THE INVENTION

Game machines (e.g., reeled slot machines or video poker machines) generate more than $15 billion per year in revenue for casinos in the United States alone. This figure accounts for more than half of the gaming revenue for a typical United States casino. The situation is similar in other countries in which game machines are popular, such as Australia. Accordingly, casinos and other operators of game machines are interested in promoting the use of game machines in order to maintain or increase revenues.

When a player feels unlucky and perceives the odds of winning to be low, the player may stop playing a gaming device or, even more troubling to the owner or operator of the gaming devices, travel to another casino where he perceives his odds of winning to be better. Commonly-owned, co-pending U.S. Reissue application Ser. No. 10/222,523, filed Aug. 16, 2002, entitled "A GAMING DEVICE FOR OPERATING IN A REVERSE PAYOUT MODE AND A METHOD OF OPERATING SAME," provides various methods and apparatus for allowing play of a gaming device that is operable in a reverse mode, such as by determining payouts according to an alternate, or reverse, payout table.

BRIEF DESCRIPTION OF THE DRAWINGS

The accompanying drawings, which are incorporated in and constitute a part of this specification, illustrate some embodiments of the invention, and together with the description serve to explain the principles of some embodiments of the invention:

FIG. 2*a* is one exemplary representation of a normal payout table according to one or more embodiments of the present invention;

FIG. 2*b* is one exemplary representation of a normal payout table according to one or more embodiments of the present invention;

FIG. 2*c* is one exemplary representation of a normal payout table according to one or more embodiments of the present invention;

FIG. 3*a* is an exemplary representation of a reverse payout table according to one or more embodiments of the present invention;

FIG. 3*b* is an exemplary representation of a reverse payout table according to one or more embodiments of the present invention;

FIG. 3*c* is an exemplary representation of a reverse payout table according to one or more embodiments of the present invention;

FIG. 3*d* is an exemplary representation of a reverse payout table according to one or more embodiments of the present invention;

FIG. 8 is an exemplary representation of a casino player database according to one or more embodiments of the present invention;

FIG. 9 is an exemplary representation of a slot machine database according to one or more embodiments of the present invention;

FIG. 13*a* is an exemplary representation of a reverse payout table according to one or more embodiments of the present invention;

FIG. 13*b* is an exemplary representation of a reverse payout table according to one or more embodiments of the present invention;

FIG. 14 is an exemplary representation of a normal mode payout table for a video poker game according to one or more embodiments of the present invention;

FIG. 15*a* is an exemplary representation of a reverse mode payout table for a video poker game according to one or more embodiments of the present invention;

FIG. 15*b* is an exemplary representation of a reverse mode payout table for a video poker game according to one or more embodiments of the present invention;

DETAILED DESCRIPTION OF THE INVENTION

Figure 1:
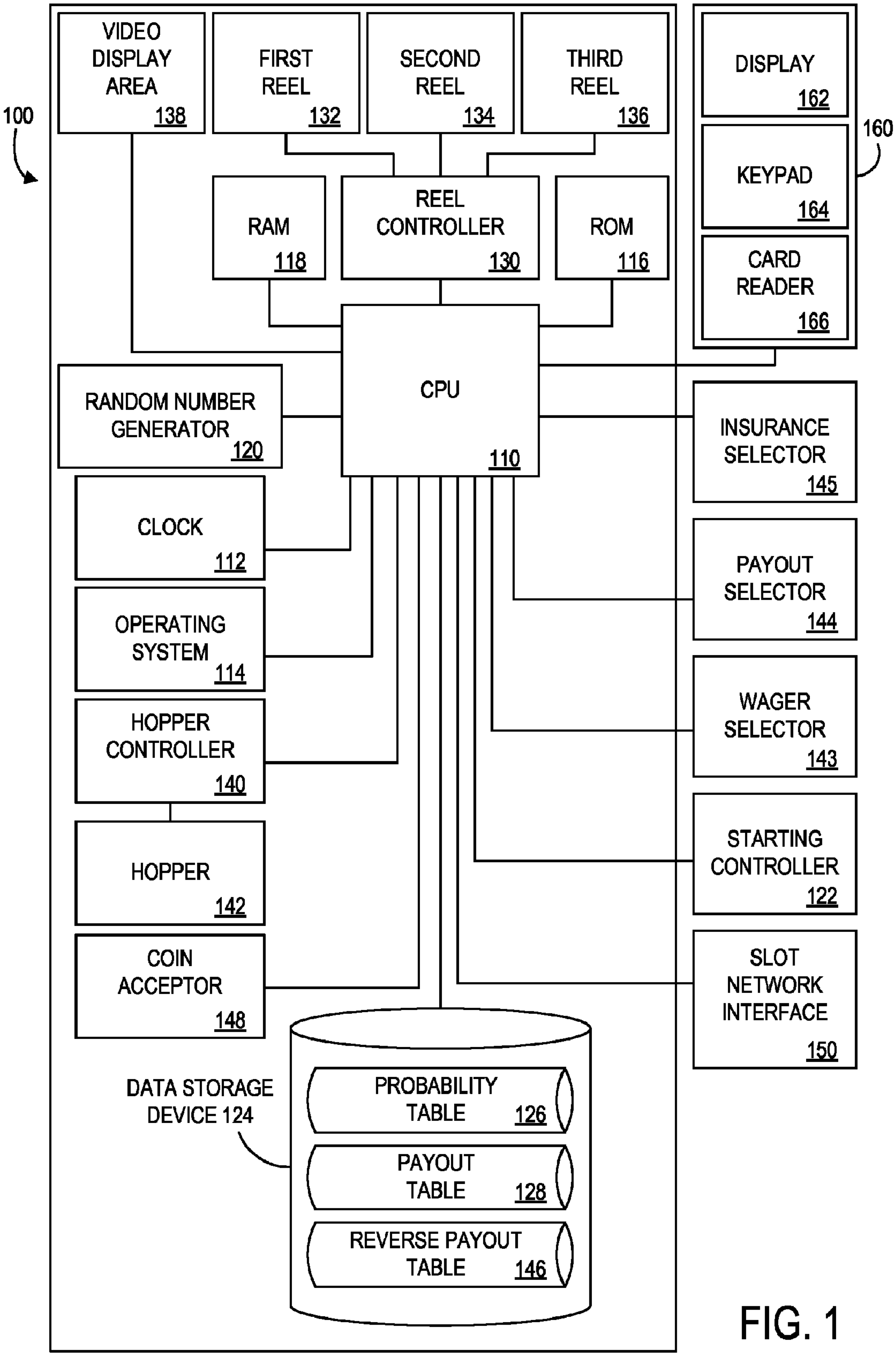
FIG. 1 is a schematic view of a slot machine according to one or more embodiments of the present invention.

The present invention is directed generally to gaming devices such as slot machines or video poker machines, and to various methods and systems for playing such gaming devices.

Some types of gaming devices are capable of operating in more than one payout mode (e.g., a normal payout mode and a reverse payout mode, a primary mode and a bonus mode). Applicants have recognized that, in some embodiments of the present invention, players of gaming devices may find appealing the ability to select an alternate payout table based on their feeling about the future outcomes to be generated by a gaming device.

In addition, Applicants have recognized that a player operating a gaming device may find it appealing that a gaming device is enabled to indicate what mode the gaming device is operating in.

Applicants have recognized that, in accordance with one or more embodiments of the present invention, some types of players may find it appealing and/or entertaining to experience the feeling of being "the house" with respect to play by one or more other players. For example, other players may be real players and/or simulated players (e.g., a video character).

Applicants have further recognized that, with respect to some embodiments of the present invention, a user operating a gaming device may find it appealing to have the gaming device represent (e.g., via audio and/or video graphics) play of a game by a virtual player. For example, the user may be shown graphics depicting play of a slot machine by a cartoon character, in which the user acts as "the house." For instance, the user could pay off wins of the cartoon character and/or receive wagers by the cartoon character.

Applicants have also recognized that, in some embodiments, operators of gaming devices may find it beneficial to provide gaming devices capable of indicating which of various modes they are operating in, as the availability of such information may make the gaming devices more appealing to players. For example, it may be advantageous to enable a gaming device to indicate to a player that the gaming device is operating in a reverse payout mode so that, for example, the player is not confused if an ordinarily winning outcome does not result in a payout to the player (or vice versa). Thus, operators of the subject gaming devices may be able to retain players for a longer period of time.

In one or more embodiments of the present invention, a slot machine user "bankrolls" play of a slot machine or other type of casino game by one or more other players (actual and/or virtual). In other words, the user can effectively adopt a financial position, relative to other players, that is similar to that of the casino or "house."

The following exemplary scenario relates a hypothetical experience of a user of a gaming device. The description of the user's experience involves some examples of some embodiments of the present invention.

According to the exemplary scenario, a user has been experiencing a run of bad luck playing a slot machine game. The user presses a "Be The House" button on his slot machine to indicate that he would like to play in a reverse payout mode. The reverse mode allows the user to take a position against play by a cartoon character. The user's slot machine then shows, on a touch screen, five different cartoon characters the user can choose to play against. The user touches one of the cartoon characters to select it. The user's slot machine then displays the cartoon character, ready to play a virtual five-reel slot machine. The character's slot machine depicted on the video screen looks like the real slot machine being played by the user.

The user is prompted to select, from a displayed menu of choices, an amount to have the cartoon character wager. After indicating the amount that he would like to have the character wager, the user is prompted with a message. The message indicates a fund of credits or "bankroll" of at least one hundred credits must be established and maintained for making payouts for any winning outcomes earned by cartoon character. The required minimum amount is based on the user's desired wager amount.

The user establishes the required account balance. The user is prompted with a message indicating that insurance will automatically be provided to cover any payout over twenty credits, and asking if the user would like to purchase insurance to cover any payout over fifteen credits. The user declines the additional coverage. Another message reminds the user that although the user is taking the house position, the user can still win the jackpot amount if the character spins the corresponding outcome.

As the exemplary scenario continues, the user watches the video screen as the cartoon character makes wagers, initiates handle pulls, achieves winning and losing outcomes, and interacts with other characters. The user is able to direct some aspects of the character's play. In response to the user pressing a "SPIN" button on his slot machine, the slot machine shows the user an animated sequence of the cartoon character pulling a lever on the character's slot machine, the reels spinning, and the reels stopping to display an outcome of reel symbols. As the house or "bank," the user collects the bets made by the cartoon character. The user's designated "bank" or other credit balance is increased when the character makes a wager (e.g., when the character is represented as initiating a handle pull). The user, however, also has to pay out any winnings earned by the cartoon character. At one point during play in the reverse payout mode, the user's bank amount fell below the minimum required balance. The user was prompted by the slot machine to add more credit (e.g., by inserting coins, authorizing a charge to a credit card), cash out, or continue normal play of the gaming device. The user elected to provide additional funds to meet the minimum required balance.

During two consecutive depicted plays by the cartoon character, the video screen of the user's slot machine showed the character pulling a handle on the cartoon character's slot machine to initiate a spin, and each time one credit was added to the user's balance to represent the character's wager. Watching the video screen, the user watched the reels of the cartoon character's slot machine stop on symbol combinations that were not winners for the character. The user earned two credits by taking the house position against the character for those two plays. During the next spin by the cartoon character, the user's credit balance was increased by one credit again, and the user saw the reels of the cartoon character's slot machine stop with two "CHERRY" symbols on a payline. On the video screen, the character's slot machine flashed "WINNER! FIVE COINS!" and the animated cartoon character raised its arms to celebrate the win. The user's credit balance was decreased by the five credits won by the character. During those three plays in reverse payout mode, as the "house" the user earned three credits for wagers by the character and paid out five credits for one winning outcome of the character.

The preceding example is provided merely to illustrate some embodiments of the present invention, and should not be construed as limiting the scope of the invention in any way. The present invention is not limited to the embodiments or examples of embodiments discussed with respect to the exemplary scenario. Various other embodiments and examples of embodiments are discussed in further detail herein, and others will be apparent to those skilled in the art in light of the present disclosure.

The accompanying figures, which are incorporated in and constitute a part of this specification, illustrate some embodiments of the invention, and together with the description serve to explain the principles of some embodiments of the invention. The left most digit(s) of a reference numeral typically identifies the figure in which the reference numeral first appears. Although some of the embodiments discussed herein are directed to slot machines, such as slot machines with video reels and slot machines with physical reels, it is to be understood that the present invention is equally applicable to other gaming devices, such as video poker machines, video blackjack machines, video roulette machines, video keno machines, multi-line machines, video lottery terminals, personal computers (e.g., running Internet gaming applications), video bingo machines, and the like.

With reference to FIG. 1, the slot machine 100 will now be described in greater detail. Each slot machine 100 includes a Central Processing Unit (CPU) 110, a clock 112, and an operating system 114. The CPU 110 executes instructions of a program stored in Data Storage Device 124 and/or Read Only Memory (ROM) 116 for playing the slot machine 100. The Random Access Memory (RAM) 118 temporarily stores information passed to it by the CPU 110. A Random Number Generator (RNG) 120 is also in communication with the CPU 110.

The slot machine 100 operates in both a normal payout mode and a reverse payout mode. With respect to the normal payout mode of the slot machine 100, the slot machine 100 operates in a conventional manner. The player starts the machine by inserting a coin into a coin acceptor 148 in communication with the CPU 110, or using electronic credit or a cashless gaming receipt, and activating a starting controller 122. If the player has deposited more than one coin in slot machine 100 or has accumulated credits stored in slot machine 100, then he can choose the desired wager per play by actuating wager selector 143 (e.g., by pressing a "BET MAX" button). Under control of a program stored, for example, in a data storage device 124 or the ROM 116, the CPU 110 initiates the RNG 120 to generate a random number; the CPU 110 then looks up the generated random number in a stored probability table 126 and finds the corresponding outcome. As will be readily apparent to those skilled in the art, the random number may be generated through any of a variety of means, including software means, electronic means, digital means, or through a physical process, such as through the scrambling of ping pong balls in a blower device, as conducted in some lottery games. Although described as random herein, the number generated may be more properly understood as pseudo-random.

According to one or more embodiments of the present invention, each of the three reels 132, 134, 136 has twenty-two total symbols or "stops" located thereon. Therefore, the three reels 132, 134, 136 provide 10,648 (22×22×22=10,648) possible reel combinations or outcomes. A reel combination of "CHERRY-BELL-PLUM" therefore represents an outcome. Alternatively, a separate random number may be generated for each reel position. These 10,648 plays are often referred to as the slot machine's "cycle." RNG 120 produces random numbers, which are mapped onto these 10,648 possible outcomes, each of which has a corresponding outcome stored in probability table 126. While each of these 10,648 possible outcomes may have an equal probability of selection, the present invention may also employ non-uniform probabilities known in the art.

Based on the corresponding outcome, the CPU 110 locates the appropriate number of coins awarded in normal payout table 128. The CPU 110 also directs a reel controller 130 to spin reels 132, 134, 136 and to stop them at a point where they display an outcome that corresponds to the randomly generated number. When the player wins, the machine stores the credits in the RAM 118 and displays them in the video display area 138.

The possible outcomes of slot machine 100 may be divided into subsets, with each subset representing a different "class" of outcome. Many slot machines, for example, are described as having three subsets or ranges of outcomes, such as high-end payouts, mid-level payouts, and low-end payouts. Non-winning payouts may form a fourth subset. High-end payouts incorporate the top payouts of the machine, such as the top three jackpots. Another way to define the subset of high-end payouts is to include all payouts exceeding a fixed multiplier of the amount wagered, such as all payouts which return at least ten times the number of coins wagered. Low-end payouts typically comprise payouts of only a few coins, such as the payout for a single cherry on either the first or third reels. Those of ordinary skill in the art will appreciate that there could be any number of subsets defined for a given machine.

A hopper controller 140 is in communication with a hopper 142 for dispensing coins. When the player requests to cash out by pushing a button (not shown) on the slot machine 100, the CPU 110 checks the RAM 118 to see if the player has any credit and, if so, signals the hopper controller 140 to release an appropriate number of coins into a payout tray (not shown).

Also in communication with the CPU 110 is a slot network server interface 150. The slot network server interface 150 provides a communication path from the slot machine 100 to a slot network and, subsequently, to a slot network server. Thus, outcome data can be exchanged between the slot machine 100 and a slot network server. As discussed below with regard to an alternate embodiment, the slot machine 100 includes a player tracking card reader device 160. The player tracking card reader device 160, which is in communication with the CPU 110, includes a display area 162, a keypad 164, and a card reader 166. As discussed below, both the keypad 164 and the card reader 166 are input devices that allow a player to communicate with the slot machine 100 and by extension, the slot network server.

In alternate embodiments, the slot machine 100 does not include the reel controller 130 and reels 132, 134 136. Instead, a video display area 138 graphically displays representations of objects contained in the selected game, such as graphical reels or playing cards. These representations are preferably animated to display the playing activity of the selected game. Thus, according to some embodiments of the present invention, information about an outcome (e.g., resulting reel symbols) may be displayed via a video display area 138, in addition to or in lieu of displaying the information via reels 132, 134, and 136. In another alternative embodiment, as will be more fully described with respect to FIG. 4F, slot machine 100 includes an overlay device 139, made of translucent materials, which covers reels 132, 134, and 136. Such an overlay device 139 conveniently allows the player to see electronic messages while viewing the physical reels underneath.

In some other alternative embodiments, the slot machine 100 includes both physical reels and a video display device that is not laid over the reels 132, 134, and 136. For example, the video display device and the reels 132, 134, and 136 may be relatively positioned with respect to a partially reflective mirror, such that an image from the video display device is projected between the viewing player and the reels 132, 134, and 136, and may appear, in some embodiments, to be imposed over the reels.

It should be noted that various aspects of this invention do not require a physical slot machine, and could instead be embodied completely in software. Such an embodiment would allow play as stand-alone software running on, for example, conventional personal computers. Examples of slot machine software include SLOTS II© software by Masque Publishing and web sites for Internet gaming by WagerWorks, Inc.

As noted above, the slot machine 100 selectively operates in a reverse payout mode. The reverse payout mode is initiated when a player selects reverse play on a payout selector 144 in communication with the CPU 110. As will be appreciated by one skilled in the art, possible payout selectors 144 include a button, a toggle switch, a virtual button on a touch screen, a software flag and the like. When reverse payout mode is selected, the slot machine 100 operates generally as described above, with the exception that the CPU 110 locates the appropriate payout in a stored reverse payout table 146 rather than the normal payout table 128. The payout tables represent sets of data that correlate outcomes with payouts. As described in detail below with reference to FIGS. 2a, 2b, 2c, 3a, 3b, 3c, and 3d, a majority of the outcomes in the normal payout tables 128a-c correspond to a losing result for the player. In the reverse payout tables 146a-d, however, the majority of the outcomes correspond to a winning result. In other words, the ratio of winning outcomes to losing outcomes is greater than one in reverse payout tables 146a-d. Stated another way, the statistical likelihood of generating any winning outcome is greater than the statistical likelihood of generating any losing outcome. Thus, while in the short run a predominance of losing outcomes may occur, the long run expectation is that more winning outcomes will result. In some cases, the amounts won or lost as determined by the reverse payout tables 146a-d are, at least in part, inversely proportional to the amounts won or lost as determined by the normal payout tables 128a-c. In other words, for a majority of given outcomes, the greater the win as determined by the normal payout tables 128a-c, the greater the amount lost as determined by the reverse payout tables 146a-d.

The normal payout tables 128 will now be described with reference to FIGS. 2a, 2b, and 2c. FIG. 2a depicts one logical representation of the normal payout table 128a. In this representation, each of the 10,648 random numbers, as represented in the "Random Number" field 230, corresponds to a set of reel positions representing an outcome, as shown in the "Reel 1" 232, "Reel 2" 234, and "Reel 3" 236 fields. Thus, by way of example, random number "00006" corresponds to an outcome of "7-BAR-CHERRY." Further, each random number (and thus outcome) also corresponds to a pay combination, as indicated in the "Pay Combination" field 238. Each pay combination may correspond to multiple random numbers and outcomes. For example, the outcome "7-BAR-CHERRY" corresponds to the pay combination "ANY/ANY/CHERRY" as does "BAR-BELL-CHERRY." This payout table illustrates the correlation between the generated random numbers, the outcomes (the position of each of the reels 132, 134, 136), pay combinations, and the payout information.

It is to be understood that the table of FIG. 2a contains information from both a probability table 126 and the normal payout tables 128b and 128c, and, as such, in an alternate embodiment may replace these tables.

The normal payout table 128b of some embodiments of the present invention will now be described with reference to FIG. 2b. As discussed below, the normal payout table 128b shown is a typical 94.5% payback payout table. In other words, statistically, the slot machine 100 will pay out 94.5% of the money wagered, and retain for the house 5.5% of the money wagered. In general, the normal payout table 128b correlates outcomes to payout information, including the number of coins awarded and the player win/loss amount for a given play. It is to be understood, based on the following description, that the number of coins awarded and the player win/loss amount are essentially alternate representations of the same information.

As shown, the normal payout table 128b can be logically represented by five fields of related information. The data represents payout information for a one coin wagered per play model. A pay combination field 210 identifies possible pay combinations to which each outcome can be correlated. These pay combinations include, for example, "ANY/ANY/CHERRY" and "BAR/BAR/BAR", for which a positive number of coins are awarded, as indicated in the "Number of coins Awarded" field 212. The pay combination field 210 also includes an "Other" entry for all other combinations, representing normally non-winning outcomes for which no payment is to be made to a player. These normally non-winning outcomes, such as "PLUM-BELL-ORANGE," result in no coins awarded, as indicated in the Number of coins Awarded field 212.

Also shown in FIG. 2*b*, the payout table 128*b* includes an "Expected Hits" field 214. The expected hits field 214 indicates the number of outcomes per cycle that correspond to a given pay combination. For example, in one cycle, outcomes corresponding to the "ANY/CHERRY/CHERRY" pay combination 210 will theoretically occur two hundred times, as indicated in the expected hits field 214. Similarly, outcomes corresponding to the "CHERRY/ANY/CHERRY" pay combination in field 210 will theoretically occur sixty-eight times in every cycle. As shown, even though both of these pay combinations include two "CHERRY" symbols, the expected hits 214 differ. It is to be understood that the difference in the expected hits for "ANY/CHERRY/CHERRY" and "CHERRY/ANY/CHERRY" results from the different number of times cherry appears on each of the three reels 132, 134, 136. Specifically, as depicted in FIG. 2*b*, the second reel 134 has more "CHERRY" stops than the first reel 132, thereby making the "ANY/CHERRY/CHERRY" pay combination more likely. This, of course, assumes that each reel stop has an equal probability of selection. It is to be understood that the present invention may also accommodate slot machines in which each reel stop has a different probability of selection.

The normal payout table 128*b* also includes a "Player win/loss" field 216. While the number of coins awarded field 212 equals the total payout, if any, made to a player, the Player win/loss field 216 represents the net change in the player's funds for each pay combination. A negative number indicates a loss by the player while a positive number indicates a win.

Further, the normal payout table 128*b* includes an "Expected Hits×Player win/loss" field 218. As implied by the name, this field represents the number of Expected hits 214 multiplied by the amount in the Player win/loss field 216 for each outcome which falls within the given pay combination. Therefore, the Expected hits×Player win/loss field 218 represents, for each pay combination, the statistically expected total amount won or lost by a player in a cycle. For example, because normally non-winning outcomes are expected 8,570 times in each cycle, and because on each play a player will lose one coin (the amount wagered) players will theoretically lose a total of 8,570 coins in every 10,648 plays for this particular pay combination in one cycle of plays on slot machine 100.

As indicated by the information in payout tables 128*a*-128*c*, the Expected hits 214 for all pay combinations totals 10,648. As further indicated by payout tables 128*a*-128*c*, the total amount won or lost for all pay combinations is negative 586, representing 586 coins lost by the player(s) and won by the house. Thus, in a one coin wagered model, in 10,648 plays, 10,648 coins are wagered, with the house retaining 586 coins. In other words, the house pays 10,062 coins back to players, or about 94.5% of the 10,648 coins wagered per each cycle, hence the 94.5% payback rate.

FIG. 2*c* depicts a normal payout table for some alternative embodiments of the present invention. In such embodiments, the player is making the necessary funds available to cover the largest potential loss for one play of slot machine 100. Because the player is only making the necessary funds available, the amount stored in the Number of coins awarded field 222 is identical to the amount stored in the Player win/loss field 226 for each listed pay combination. Thus, slot machine 100 does not subtract the amount wagered before each play. Instead, the net win or loss is added to or subtracted from the player's credit balance.

It is to be understood that the normal payout tables 128*b* and 128*c* depicted in FIGS. 2*b* and 2*c* include some information not necessary to the operation of the present invention. Thus, in alternate embodiments, the normal payout tables 128*b* and 128*c* correlate only the pay combinations 210, 220 to either the number of coins awarded 212, 222 or the Player win/loss 216, 226. The normal payout tables 128*b* and 128*c* need not include the Expected hits fields 214, 224 or the Expected hits×Player win/loss fields 218, 228. These fields include information that merely describes, not dictates, the operation of the slot machine 100.

It is also to be understood that the normal payout tables 128*b* and 128*c* may correlate the Number of coins awarded 214, 224 and the Player win/loss 216, 226 amounts to pay combinations for plays where other than one coin is wagered. Thus, the normal payout tables 128*b* and 128*c* are merely exemplary of possible normal payout tables. In this regard, an alternate embodiment utilizes multiple payout tables, each containing payout information for a different amount wagered. It is to be understood that in multiple coin models, there are outcomes that may provide a payout to the player but result in a loss. For example, when three coins are wagered, a payout combination may call for a payout of two coins, resulting in a loss of one coin for the player. In another embodiment, a single payout table contains the payout information for each of the different amounts wagered.

It is further to be understood that the normal payout tables 128*a-c* need not include a pay combinations field at all. Rather, in an alternate embodiment, the normal payout tables 128*a-c* directly correlate outcomes to payout information, such as the Number of coins awarded or the Player win/loss amounts.

Other normal payout tables that are within the scope of the present invention include those having different payout amounts, different reel symbols, and different pay combinations. In general, however, typical normal payout tables can be characterized in that a player wins on the occurrence of the relatively few outcomes that are the least likely to occur, and the amount of the win increases as the likelihood of the particular outcome occurring decreases.

The exemplary reverse payout tables 146*a*-146*d* will now be described with reference to FIGS. 3*a*, 3*b*, 3*c*, and 3*d* and continuing reference to FIGS. 2*b* and 2*c*. The reverse payout tables 146*a-d* are identical in structure to the normal payout tables 128*b* and 128*c*, as described in FIGS. 2*b* and 2*c*. Inherent in this structure is the number of total possible outcomes and the corresponding pay combinations. They are different, however, in the data described in the Number of coins awarded fields 312, 322, 332, 342; Player win/loss fields 316, 326, 336, 346; and the Expected hits×Player win/loss fields 318, 328, 338, 348.

In general, the reverse payout tables 146*a*-146*d* can be characterized as having payouts which occur for the relatively numerous outcomes that are the most likely to occur, while a loss occurs for the relatively few outcomes that are the least likely to occur. Thus, for the majority of outcomes, where the normal payout tables 128*b* and 128*c* provide for a zero payout or a loss, the reverse payout tables 146*a*-146*d* provide for a positive payout, or a win. Likewise, a positive payout or win in the normal payout tables 128 correspond to a loss in the reverse payout tables 146*a*-146*d*.

The reverse payout table 146*a* is exactly the reverse of the normal payout table 128*b* in that each player win/loss result is reversed. Thus, because the normal payout table 128*b* favors the casino by about 5.5%, the reverse payout table 146*a*, which is exactly the opposite of the normal payout table 128*c*, favors the player by about 5.5%. In other words, the reverse payout table 146*a* is a 105.5% payback table.

Like the normal payout tables 128*a-c*, the reverse payout tables 146*a-d* include a pay combination field 310 containing the same normally winning and normally non-winning pay combinations found in the normal payout tables 128. As used herein, the term "normally winning" means winning as determined by the normal payout tables 128. Similarly, "normally non-winning" and "normally losing" means non-winning as determined by the normal payout tables 128*b* and 128*c* (i.e. pay combination "Other").

As with the normal payout tables 128*a*-128*c*, the Player win/loss fields 316, 326, 336, 346 and the "Expected Hits×Player win/loss" fields 318, 328, 338, 348 contain the theoretical amounts won or lost per play and per cycle, respectively. However, for normally winning pay combinations, the reverse payout tables 146*a*-146*d* indicate a loss to the player, and for normally losing pay combinations, the reverse payout tables 146*a*-146*d* indicate a win for the player. In other words, the player win/loss amounts 316, 326, 336, 346 of the reverse payout tables 146*a*-146*d* may be arrived at by multiplying each Player win/loss amount 216 of the normal payout table 128*b* by negative one ("−1"). Because the expected hits 314, 324, 334, 344 are identical to those of the normal payout tables 128*b* and 128*c*, the "Expected Hits×Player win/loss" amounts 318 are the reverse of those in the normal payout tables 128*b* and 128*c*. Thus, while the normal payout table 128*b* results in the player losing 586 of the 10,648 coins wagered, the reverse payout table 146*a* results in the player winning 586 coins. Thus, the slot machine 100 described in FIG. 3*a* becomes a 105.5% payback machine.

Because in the reverse payout table 146*a* depicted in FIG. 3*a* the Player win/loss amounts 316 include losses greater than one coin, the player must place additional funds at risk. As shown in FIG. 3*a*, for example, the player faces a loss of ninety-nine coins if an outcome of "7-7-7" is produced. As discussed below, the funds necessary to cover such losses may be stored credit that the player previously accumulated, a credit balance stored in memory, additional cash fed into the machine via a bill validator or the coin acceptor, funds stored on a stored value card or "smart card", in a player "comp" account, in a cashless gaming account, or in a credit/debit card account.

FIG. 3*b* depicts an alternate embodiment of the payout table 146*a* described in FIG. 3*a*. In reverse payout 146*b* the slot machine 100 reduces the player's credit balance by ninety-nine coins prior to generating the outcome. Specifically, the player places ninety-nine coins at risk. An outcome of "Orange-Orange-Orange", for example, results in a payout of eighty coins, netting a to a loss of nineteen coins for the player.

Because the player faces large potential losses with reverse payout tables 146*a* and 146*b*, slot machine 100 could incorporate an insurance protocol in which the player deposits one coin and presses insurance selector 145 before each spin. In the event of a jackpot, the insurance policy covers the amount of the loss. Multiple insurance policies are possible, with the cost of the insurance rising with the amount of coverage increasing. The amount of coverage may be calculated with reference to the Expected hits×Player win/loss 318, 328 in order to capture both the frequency and magnitude of the covered payouts.

In practice, a reverse payout table that favors players, such as reverse payout tables 146*a* or 146*b* in FIGS. 3*a* and 3*b*, is probably unacceptable to the casino operator except as a restricted promotional device. To ensure that the casino continues to make money, adjustments may be made to the reverse payout tables so that they favor the casino. In the embodiment depicted in FIGS. 3*c* and 3*d*, the reverse payout tables 146*c* and 146*d* are adjusted so that they provide for payouts which are less than the total amount of coins wagered for one cycle. The reverse payout table 146*c* shown in FIG. 3*c* includes the same fields as the reverse payout tables 146*a* and 146*b* of the prior embodiments, and the same individual pay combinations. Furthermore, in the embodiment of FIG. 3*c*, reverse payout mode requires a player to wager (and therefore potentially lose) at least five coins while paying out only six coins for a normally non-winning outcome/pay combination. It should be noted that the amount of coins wagered per play could be any number of coins as specified by the casino operator. Although reverse payout table 146*c* is described using whole coins, the present invention may be practiced using fractional coin values. Thus, for a wager of one coin, a payout may total only one sixth of a coin. These fractional amounts may be accumulated in RAM 118 and paid out when a whole coin is reached.

Alternatively, in other embodiments, the number of consecutive normally non-winning outcomes may only pay out for up to a predefined number of times, for example, in a given time period, a defined number of successive wins, and/or a defined number of coins output. There are many other possible ways to control the total amount paid out to a player in order to maintain a reasonable house advantage.

Focusing on the "Other," or normally losing pay combination, it is apparent that such a pay combination will theoretically hit 8,570 times in one cycle, each time causing the player to win one coin, as depicted in the Player win/loss field 336, and awarding six coins, as depicted in the number of coins awarded field 332. Six coins are awarded because the player receives the five coins that were wagered plus the one coin won.

Also shown in the Player win/loss field 336, the amount lost for each of the normally winning pay combinations is five coins. Because the player can only lose what is wagered and no more, namely five coins, there is no need to place additional funds at risk. Furthermore, given the five coin loss for each normally winning pay combination and the one coin win for each normally losing pay combination, the reverse payout table 146*c* theoretically results in the house winning 1,820 coins of the 53,240 coins wagered per cycle ({10,648 plays}×{5 coins/play}=53,240 coins). In other words, the reverse payout table 146*c* is approximately a 96.5% payback table.

The reverse payout table 146*d* shown in FIG. 3*d* includes the same fields as the reverse payout tables 146*a*-146*c* of the prior embodiments, and the same individual pay combinations. The reverse payout table 146*d* of FIG. 3*d*, however, represents an embodiment where the player makes the five coins available (i.e. slot machine 100 does not reduce the player's credit balance by the amount of the wager before each play).

Figure 4A:
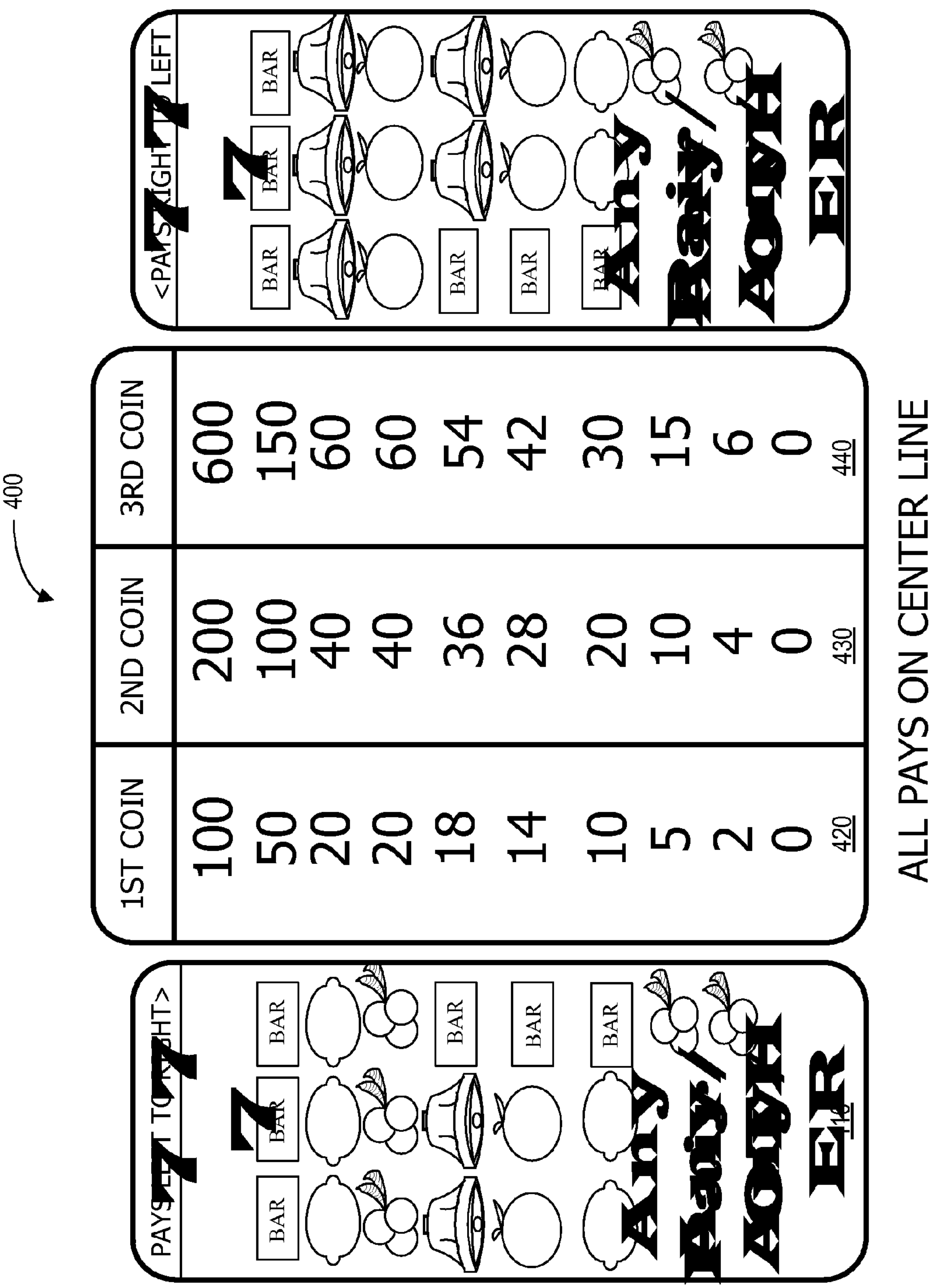
FIG. 4*a* is an exemplary display of a normal payout table according to one or more embodiments of the present invention.

During normal payout mode, the slot machine 100 provides a normal payout display 400, as shown in FIG. 4*a*, on the video display area 138. The normal payout display 400 includes a pay combination field 410 that displays normally winning pay combinations. The normal payout display 400 also displays payout information for each pay combination. Specifically, as depicted in FIG. 4*a*, the payout display 400 includes three fields of payout information, each directed to a different number of coins wagered. The "1ST COIN" field 420 includes the number of coins awarded when one coin is wagered, as indicated in field 212 of the normal payout table 128*b*. Similarly, the "2ND COIN" field 430 includes the number of coins awarded when two coins are wagered, and the "3RD COIN" field 440 includes the number of coins awarded when three coins are wagered.

Figure 4B:
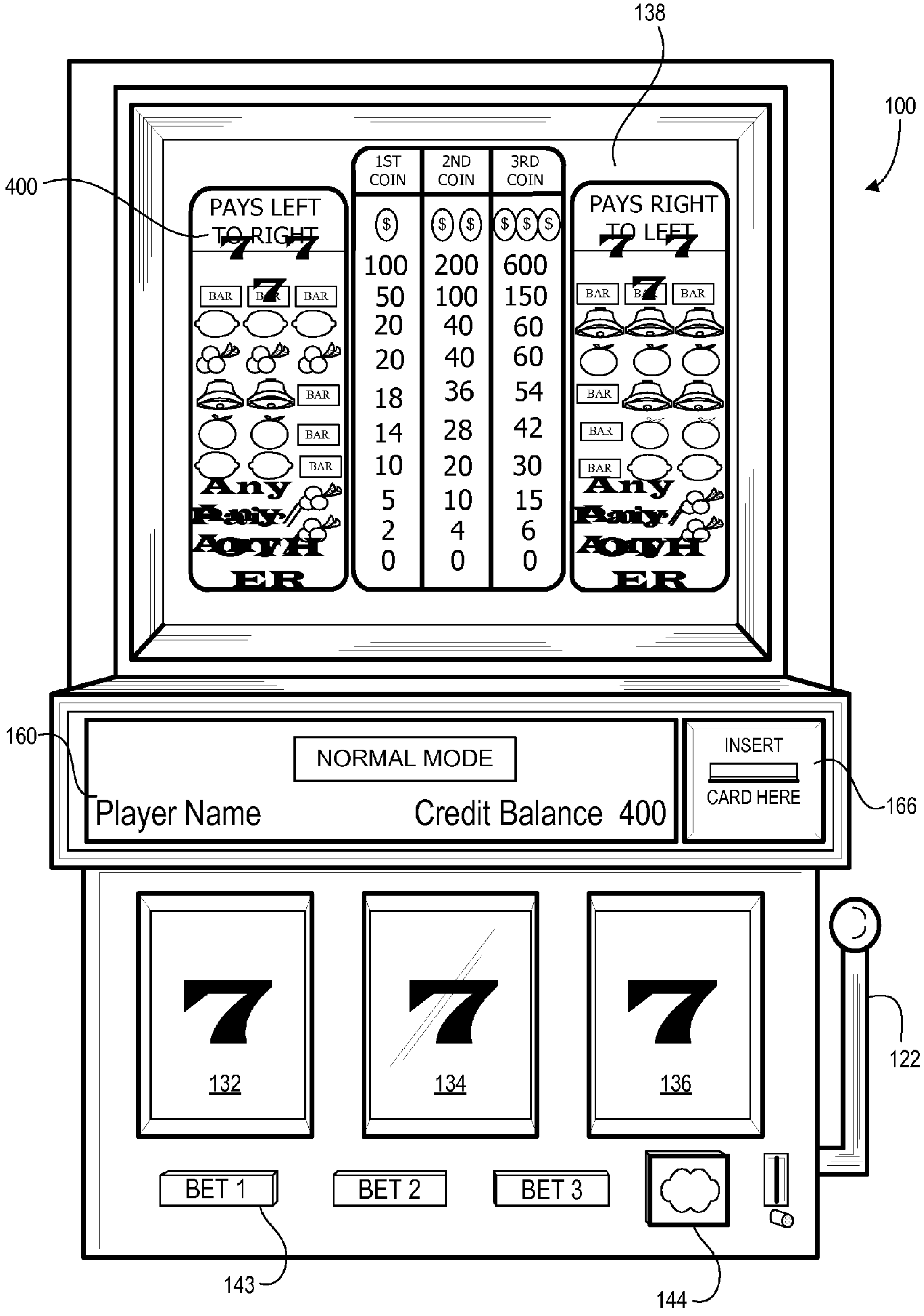
FIG. 4*b* is a plan view of an exemplary normal payout table enabled slot machine according to one or more embodiments of the present invention.

FIG. 4*b* is a plan view of slot machine 100 in normal payout mode. Slot machine 100 is configured for normal play as is illustrated by the normal payout display 400 displayed in video display area 138.

Figure 4C:
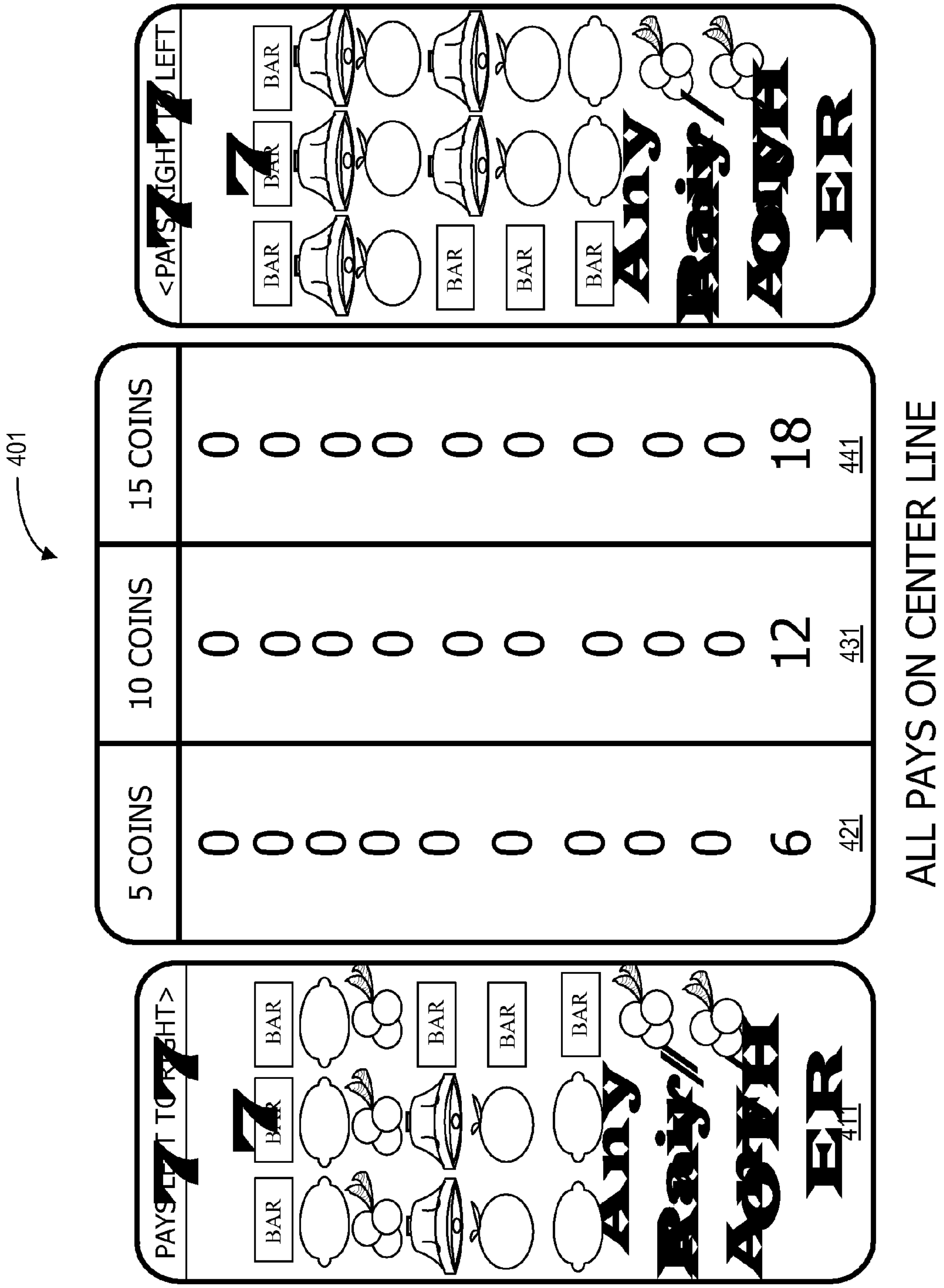
FIG. 4*c* is an exemplary display of a reverse payout table according to one or more embodiments of the present invention.

During reverse payout mode, the slot machine 100 provides a reverse payout display 401, as shown in FIG. 4*c*, on the video display area 138. The reverse payout display 401 includes a pay combination field 411 that displays normally winning pay combinations and the "Other" pay combination. The reverse payout display 401 also displays payout information for each pay combination. Specifically, as depicted in FIG. 4*c*, the payout display 401 includes three fields of payout information, each directed to a different number of coins wagered. The "5 COINS" field 421 includes the number of coins awarded when five coins are wagered, as indicated in field 332 of the reverse payout table 146*c*. Similarly, the "10 COINS" field 431 includes the number of coins awarded when ten coins are wagered, and the "15 COINS" field 441 includes the number of coins awarded when fifteen coins are wagered.

Figure 4D:
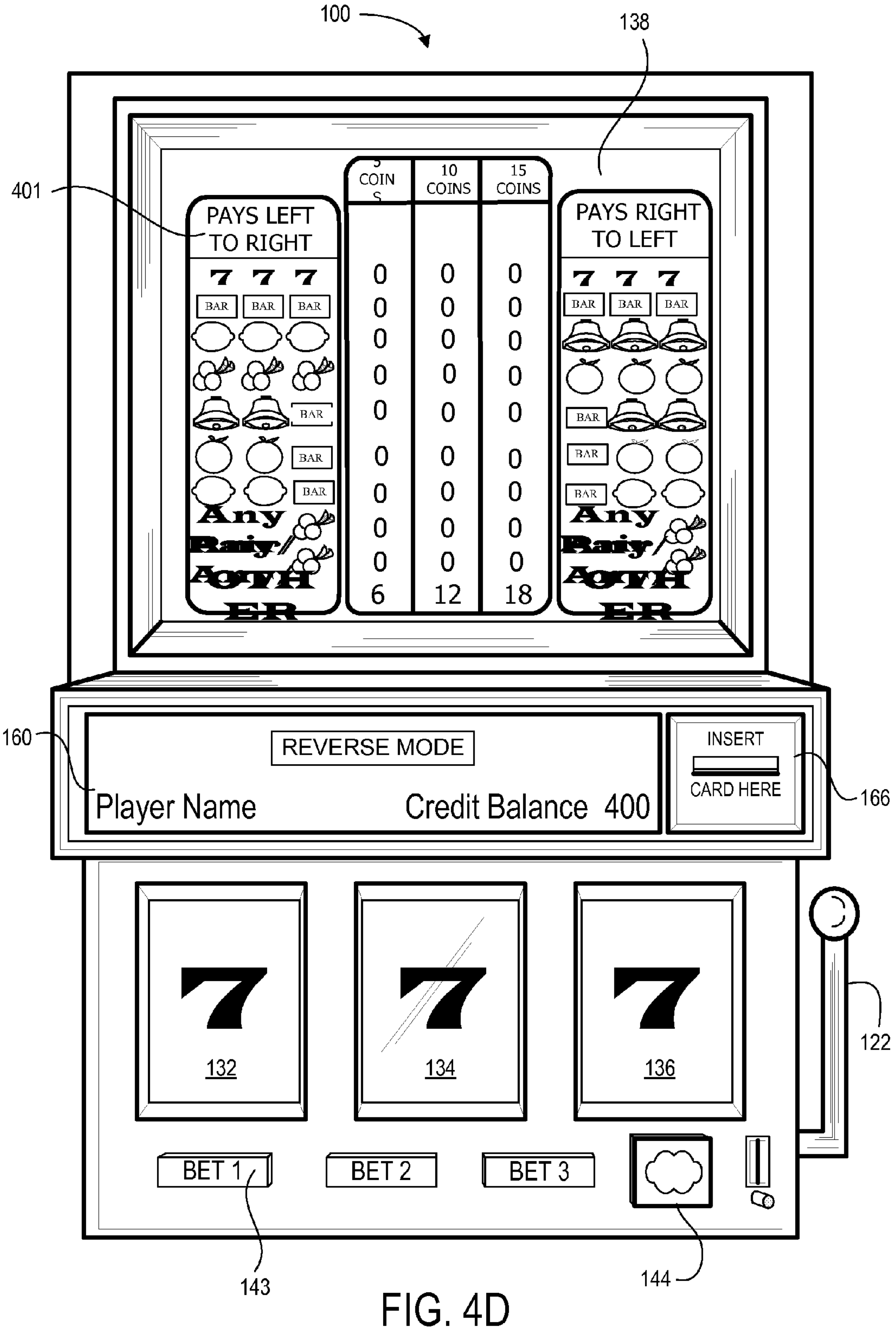
FIG. 4*d* is a plan view of an exemplary reverse payout table enabled slot machine according to one or more embodiments of the present invention.

FIG. 4*d* is a plan view of slot machine 100 in reverse payout mode. Slot machine 100 is configured for reverse play as is illustrated by the reverse payout display 401 displayed in video display area 138.

Figure 4E:
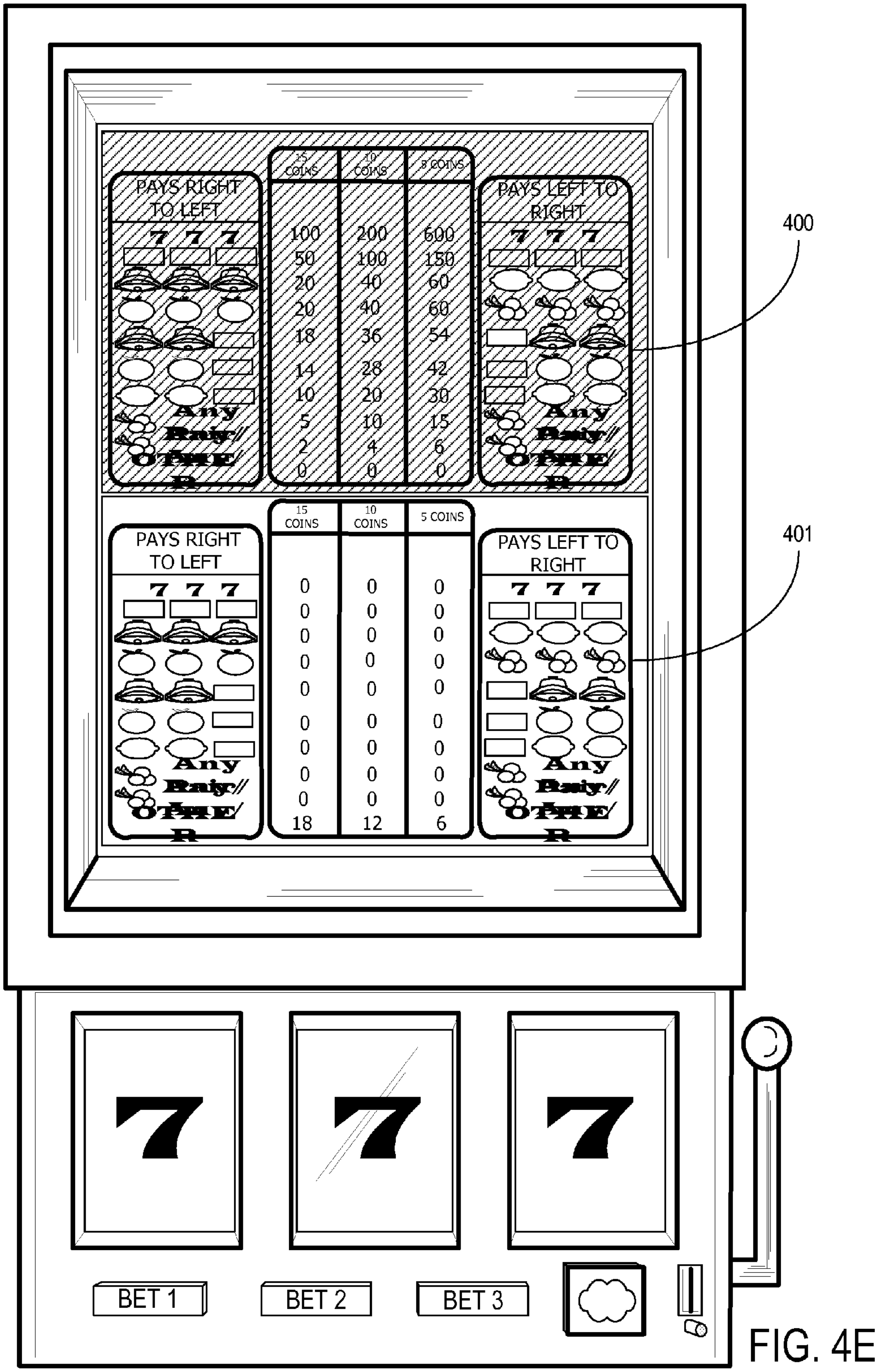
FIG. 4*e* is a plan view of an exemplary reverse payout table enabled slot machine according to one or more embodiments of the present invention.
Figure 4F:
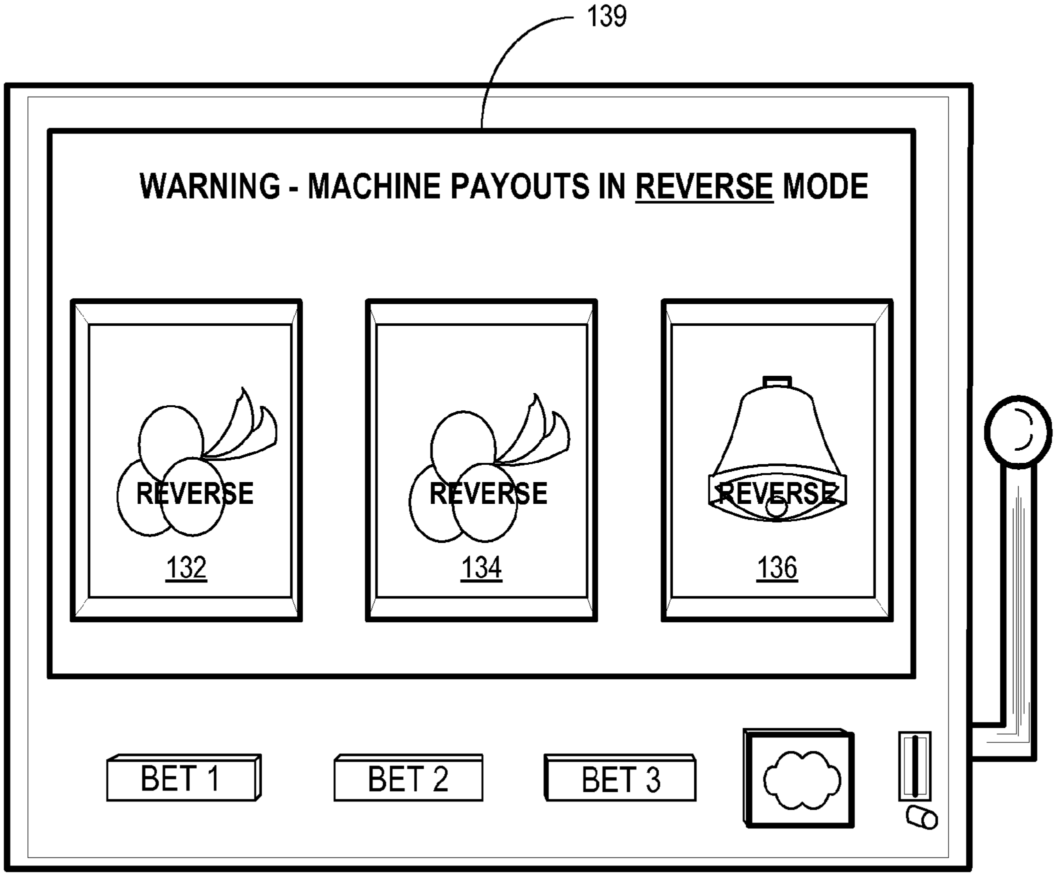
FIG. 4*f* is a plan view of an exemplary reverse payout table enabled slot machine according to one or more embodiments of the present invention.
Figure 4G:
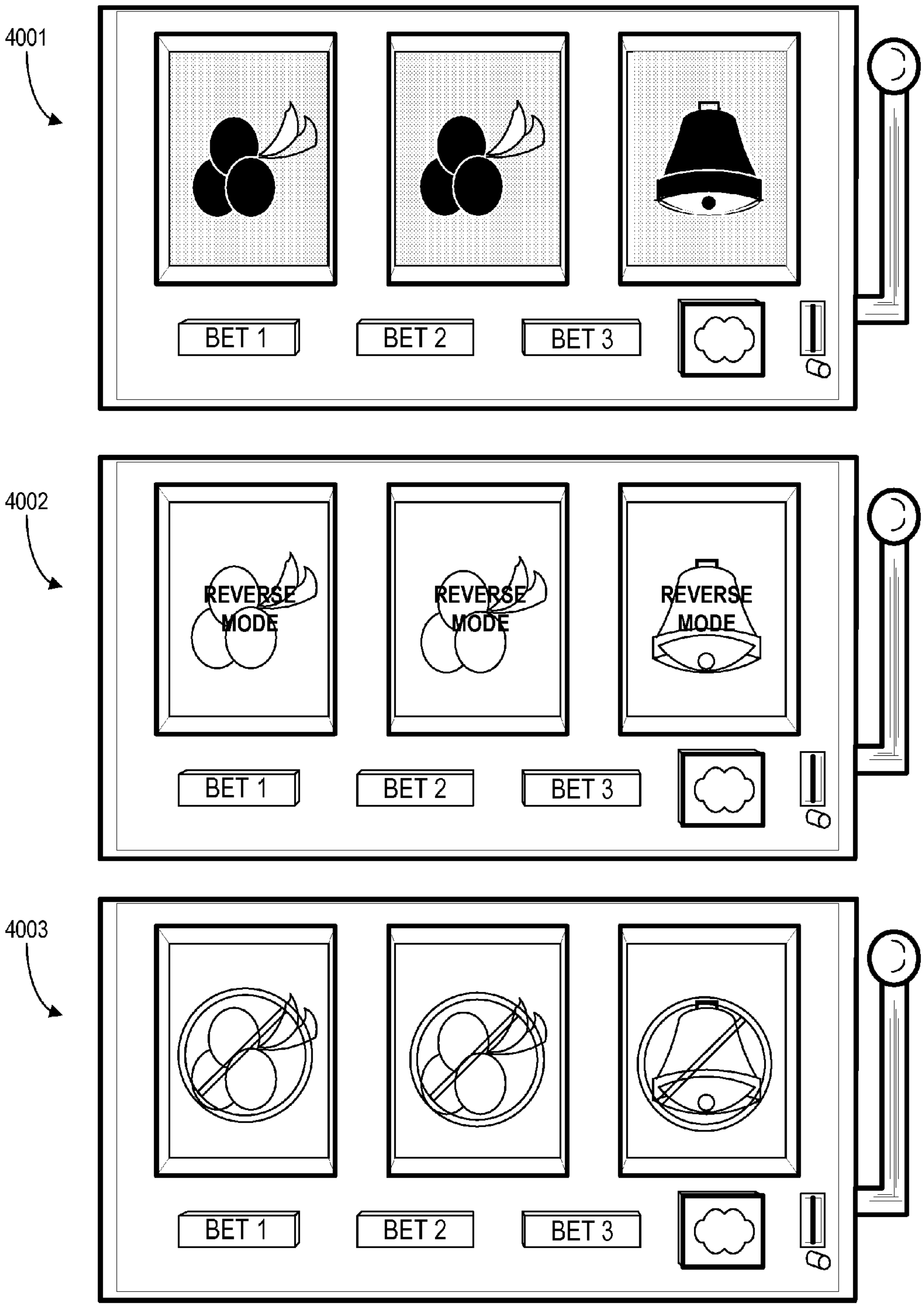
FIG. 4*g* is a plan view of an exemplary reverse payout table enabled slot machine according to one or more embodiments of the present invention.

As discussed herein, a player operating slot machine 100 without knowing that he was playing in reverse mode could be upset when he achieves an ordinarily wining outcome that results in a loss in reverse mode. Accordingly, some embodiments of the present invention provide for the slot machine 100 to include one or more informational and/or warning features for indicating to a player that the gaming machine is operating in a reverse payout mode. Of course, the slot machine 100 could also employ any of the various techniques discussed herein for indicating when the slot machine 100 is operating in a normal payout mode. FIGS. 4*e*, 4*f*, and 4*g* depict some exemplary techniques for indicating in what payout mode a gaming device is currently operating.

FIG. 4*e* is a plan view of slot machine 100, and depicts an exemplary embodiment in which the normal payout display 400, representing at least a portion of a normal payout table, and the reverse payout display 401, representing at least a portion of a reverse payout table, are displayed simultaneously. In order to minimize confusion as to which of the displayed payout tables is applicable for a given handle pull, the active payout table may be backlit, while the inactive payout table may be dark. In this way the current mode of the machine may be readily apparent to the player.

In an embodiment in which the payout tables are electronically displayed (e.g., in one or more video display areas 138), the inactive payout table could be grayed out, while the active payout table is displayed at maximum brightness. FIG. 4*e* illustrates an embodiment in which normal payout display 400 is darkened and reverse payout display 401 is fully lit, indicating to the player that the reverse payout table is in effect for the current handle pull.

Other exemplary ways of indicating that a displayed payout table is inactive include, without limitation, changing background colors, using a smaller font, making the font fuzzy, shrinking the size of table, putting the international symbol for "No" (e.g., a circle with a diagonal slash) over the entire payout table (or above the table, etc.), and the like. Exemplary techniques for highlighting a payout table to indicate that the payout table is in use include, without limitation, flashing the text, making the font larger, electronically moving it, scrolling the pay information (e.g., as on a marquee), or flashing text across the payout table, including messages to the player indicating that the table is currently in use.

While the two payout tables are illustrated in FIG. 4*e* as separate tables, in an alternative embodiment they could be combined into a single payout table, for example, indicating both the normal and reverse payouts for a particular outcome (or set of outcomes). In one example, payouts that are not currently eligible could be temporarily blacked out, or indicated as being inactive in accordance with one or more of the techniques discussed herein. Similarly, the active payouts in a combined payout table could be highlighted according to various techniques discussed herein.

FIGS. 4*f* and 4*g* depict some other exemplary indications that a gaming device is operating in a reverse payout mode. In FIG. 4*f*, an overlay device 139 is shown positioned between a player and the physical reels 132, 134, and 136 such that the player is able to view the three physical reels 132, 134, and 136 through at least a portion of the overlay device 139. The overlay device 139 preferably is a translucent or transmissive electronic display device, operative to display fixed and/or scrolling electronic messages across its surface. The overlay device 139 may comprise any of various different commercially available technologies. For example, a display device such as the NOMAD® PERSONAL DISPLAY SYSTEM® by MICROVISION INC. could be adapted to allow an image to be projected onto the surface of an overlay device 139 using a high-luminosity LCD projector.

Alternatively, Liquid Crystal Displays (LCDs) may be used to create images on an overlay device 139 by selectively blocking light passing through a polarizing filter. Such technology can be used to create text and/or animated graphic images. In some embodiments, the overlay device 139 may comprise a touch screen operable to register player input, such as the use by the player of one or more virtual buttons on the touch screen.

Preferably, the overlay device 139 is transparent enough (or may be responsive to signals from the slot machine 100 to become transparent enough, such as by the selective use of a polarizing filter) so that the player may view the physical reels 132, 134, and 136 during play. In addition, as depicted in FIG. 4*f*, various messages, images, and/or text may be displayed on the overlay device 139 to help the player understand whether he is playing in normal mode or in reverse mode. Using the overlay device 139, for example, a message can be positioned in the player's line of sight of the physical reels, making it difficult for the player to miss the message. As discussed herein, displayed images and/or text may be moving, flashing, animated, or otherwise highlighted in some way in order to capture the player's attention. In the exemplary embodiment depicted in FIG. 4*f*, the message "Warning—Machine Payouts In Reverse Mode" appears near the top of overlay device 139. Such warnings might move up and down during play, or could flash intermittently to attract the attention of the player. Additional warning text appears displayed over each of the reels 132, 134, and 136 in the form of the word "Reverse." Other types of messages, symbols, and warnings for indicating to a player in which mode the slot machine 100 is operating in are discussed herein and with respect to FIG. 4*g*. Note that the overlay device 139 may also be used to indicate when the slot machine 100 is operating in a normal payout mode (e.g., by displaying the word "Normal" over the reels 132, 134, and 136).

In some alternative embodiments of the invention, the slot machine 100 has physical reels 132, 134, and 136 in addition to a video display area 138. The video display area 138 may be used to duplicate the result of the reel spins electronically. Any of the various warning messages described herein could be displayed on video display area 138 in addition to or in lieu of use of the overlay device 139. In still other embodiments, audio warnings and messages could be communicated to the player, for example, using an audio speaker.

FIG. 4*g* illustrates various embodiments of the present invention, in which an indication of the mode of the machine may be presented as being on the reels themselves. Reel set 4001 represents a set of reels for use when operating under reverse payout table 401. The symbols in the reel set 4001 appear as a photographic negative of the normal reels. In this "negative mode", the symbols themselves are predominantly black and the background has been darkened. In reel set 4002, the text message "Reverse Mode" is electronically displayed on each symbol. As discussed herein, the text could be highlighted in some way. The text could move with the reel symbol (e.g., as if part of the reel symbol) or stay stationary (e.g., as if the reels spin under the message). Another embodiment, as represented in reel set 4003, illustrates the use of the international symbol of a circle with a diagonal line through it, representing "No" or "Not." Such a symbol could be displayed as superimposed over each reel or each reel symbol, to indicate the player is playing in reverse mode.

While these designations are described above using electronic reels (e.g., displayed in video display area 138), they could of course also be applied to physical reels in an embodiment in which slot machine 100 is permanently in reverse payout mode. In another embodiment, each reel could have two sets of reel symbols imprinted on it—one for normal mode and one for reverse mode. While in normal mode, for example, only the symbols of normal mode would appear. In yet other embodiments, the slot machine 100 may have two sets of physical reels, each corresponding to a particular mode of play.

According to some embodiments of the present invention in which the slot machine 100 comprises physical reels, electronic video images could be added to physical reels, for example, by wrapping thin flexible electronic displays around the physical slot machine reels. Accordingly, the physical reels would spin, but the images on those reels could be manipulated as on an electronic video reel display. This would allow more flexibility in configuring slot machines with physical reels to display warnings relating to reverse mode payouts. Such embodiments may be particularly suitable for retrofitting slot machines with physical reels using minimal time and expense.

Figure 5A:
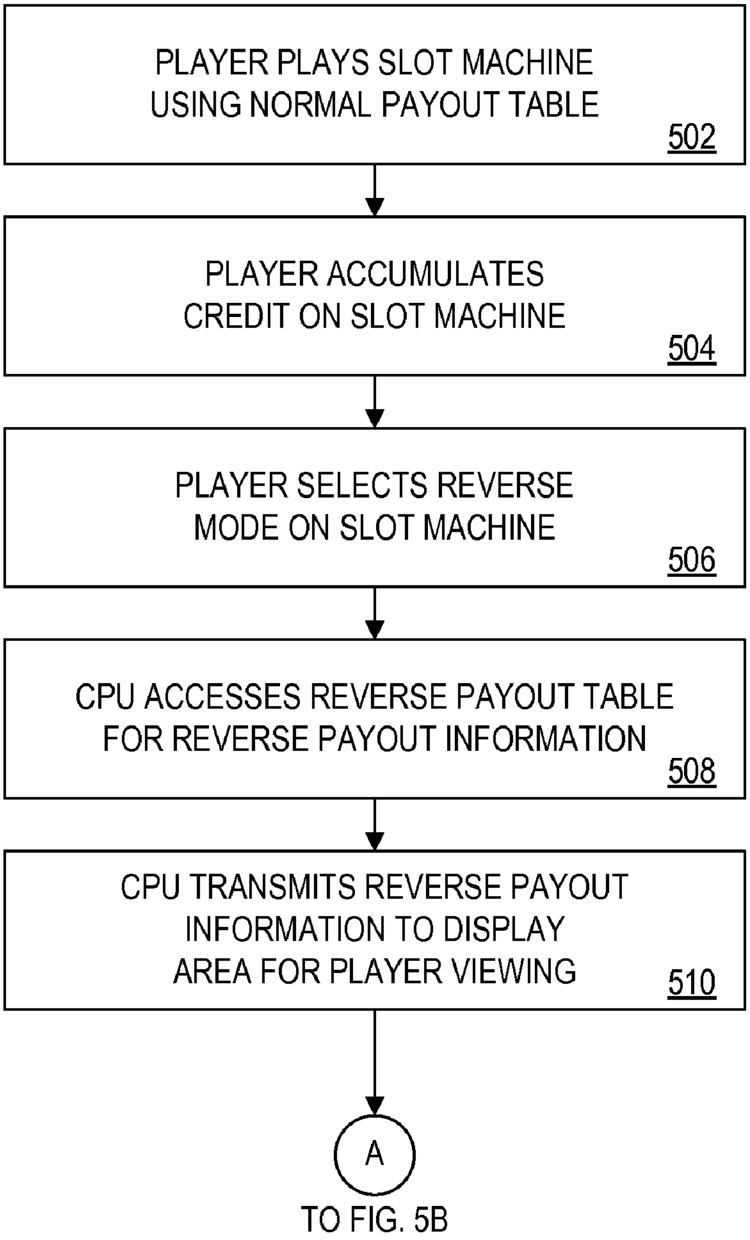
FIGS. 5*a* and 5*b* are flow diagrams depicting an exemplary process according to one or more embodiments of the present invention.

The operation of some embodiments of the present invention will now be described with reference to FIGS. 5*a* and 5*b*, and with continuing reference to FIGS. 1-3*d*. In a typical scenario, a player plays a slot machine 100, shown as step 502, using the normal payout table 128*b*.

While playing the slot machine 100 in normal payout mode, the player may accumulate credits on the slot machine 100 by hitting one or more jackpots. Having hit a jackpot and accumulated credits, shown in step 504, a player may decide that his or her "luck has run out" or the machine has "gone cold." Rather than terminating play, the player may elect to switch to a reverse payout mode in an attempt to exploit his or the machine's perceived bad luck. Thus, in step 506, the player selects reverse payout mode on the payout selector 144 of the slot machine 100. The CPU 110 receives a signal from the payout selector 144 in step 508 and accesses the reverse payout table 146*c*. Payout selector 144 could also select from among a set of possible reverse payout tables 146*a*-*d*, allowing the player a choice of different payout structures. Payout selector 144 may also be triggered automatically by slot machine 100. For example, after winning two jackpots with normal payout table 128*b*, the game may automatically switch to reverse payout table 146*c*, or at least indicate to the player that the option is available. Having accessed the reverse payout table 146*c*, the CPU 110 causes a reverse payout display 401 to be displayed on the video display area 138 in step 510. Alternatively, the information of reverse payout table 146*c* could be displayed on the belly glass of the slot machine along with the normal payout information as is customary for slot machines.

Figure 5B:
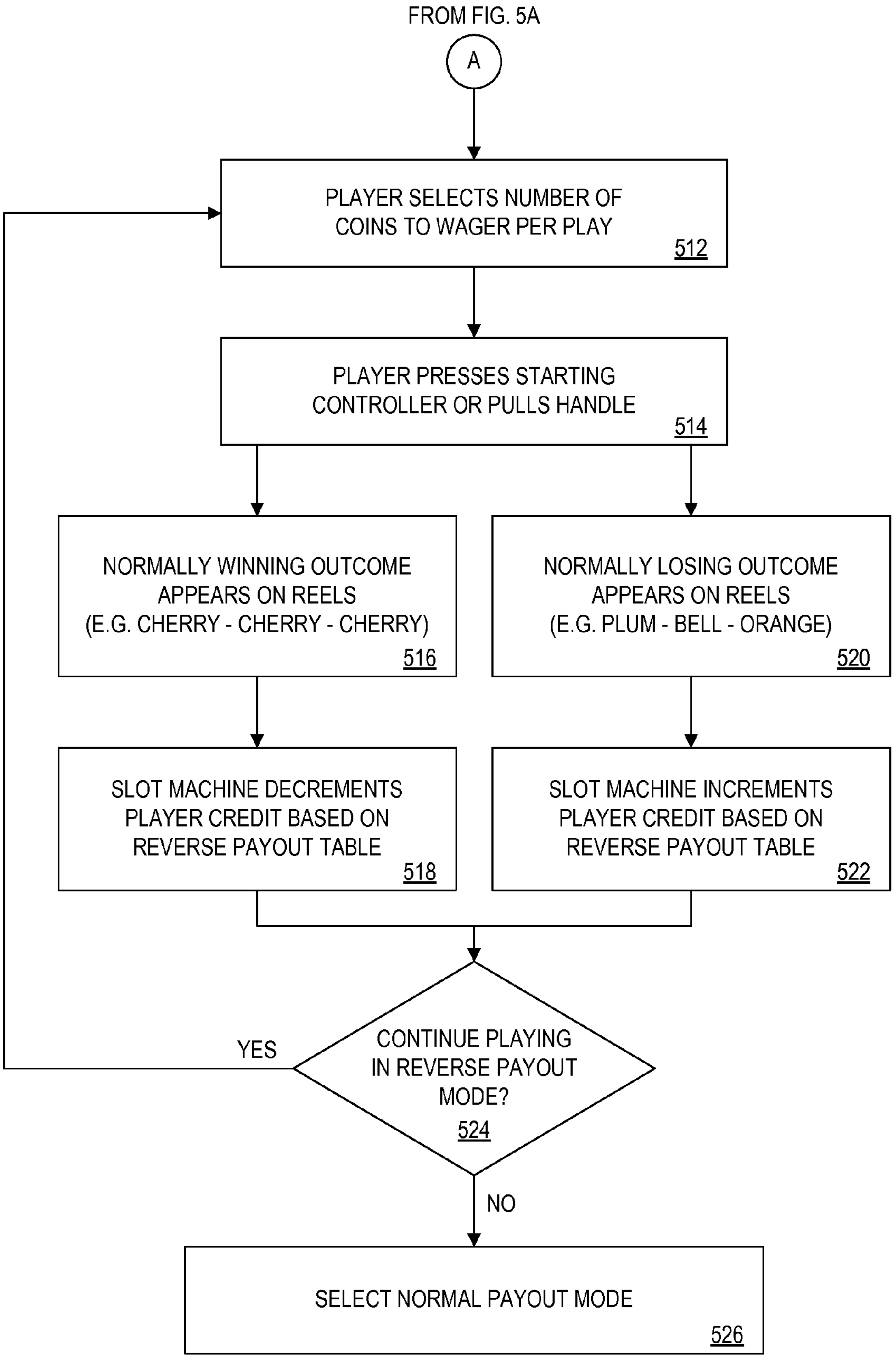
Figure 6:
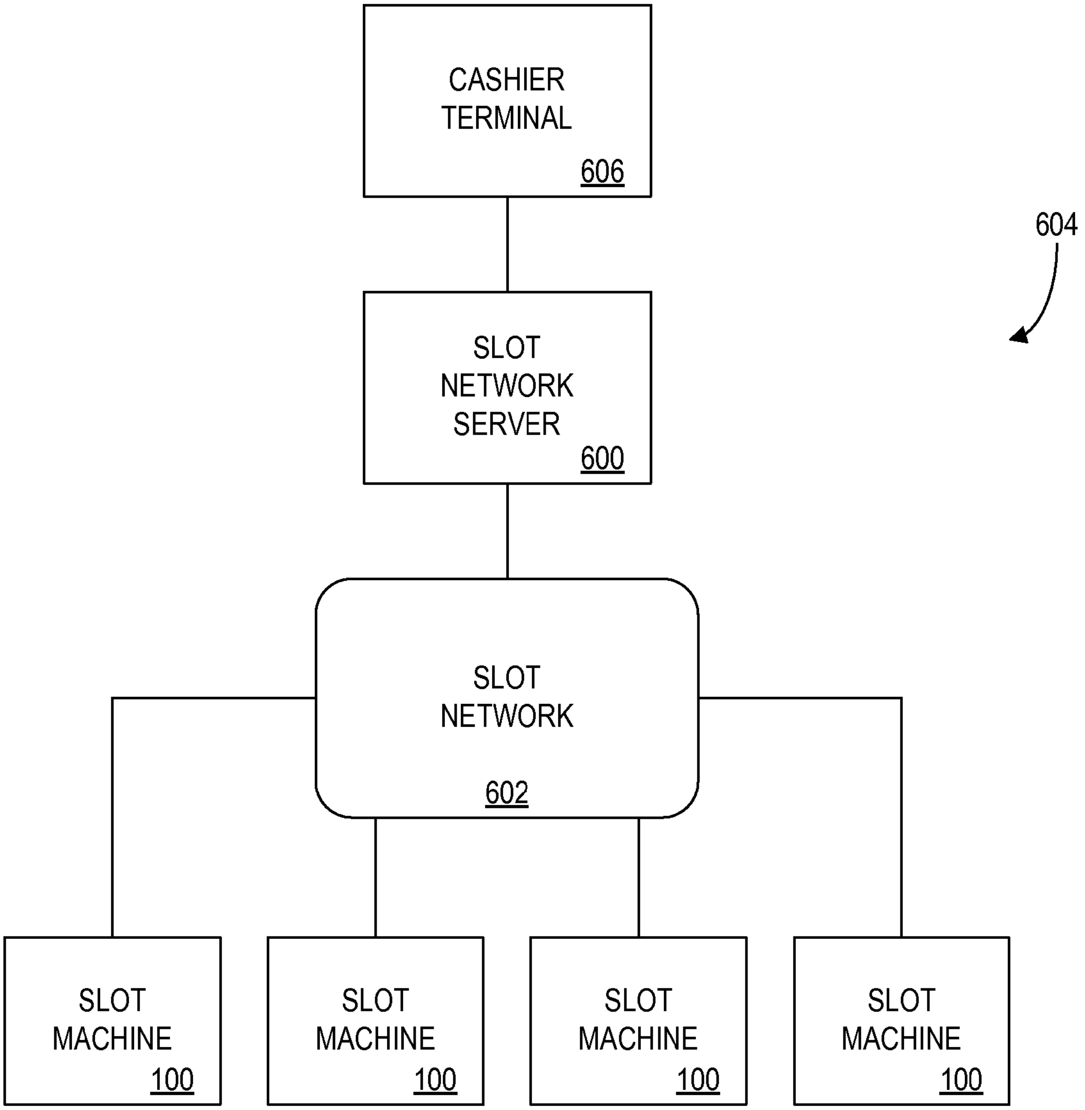
FIG. 6 is an overall schematic view of a system according to one or more embodiments of the present invention, including a slot machine, a slot network server, and a cashier terminal.

As further described in FIG. 5*b*, the player then proceeds to initiate play of the slot machine 100 in the reverse payout mode. Specifically, in step 512, if the player has accumulated credits on the slot machine 100, then the player selects the number of coins to wager. Before continuing, the CPU 110 determines whether the player has enough accumulated credits stored to cover all potential losses, as indicated in the Player win/loss field 336 of reverse payout table 146*c*. For example, if the maximum possible loss is ninety-nine coins, then the player must deposit or make available funds equivalent to the value of the ninety-nine coins. In one embodiment, the player merely deposits enough coins in the coin acceptor 148. CPU 110 registers how many coins have been wagered. In step 514, the player presses the starting controller 122 or pulls a handle (not shown) to initiate the random number generator 120 and the spinning of reels 132, 134, 136.

As shown in step 516, the results from random number generator 120 and the probability table 126 may initiate CPU 110 to display a normally winning outcome, such as "CHERRY-CHERRY-CHERRY" on the reels 132, 134, 136. If such a normally winning outcome occurs, then, in step 518, the slot machine 100 decrements the player's stored credits based on the reverse payout table 146*c*. Decrementing the player's stored credits involves the CPU 110 accessing the reverse payout table 146*c*. CPU 110 proceeds to correlate the outcome, "CHERRY-CHERRY-CHERRY", to the "CHERRY/CHERRY/CHERRY" pay combination in the pay combination field 330, and to the corresponding loss of five coins in the Player win/loss field 336. Thus, in step 518, the CPU 110 adjusts the stored credits accordingly.

Another possibility, based upon the random number generator 120 and the probability table 126, is that a normally losing outcome, such as "PLUM-BELL-ORANGE" may appear on the reels 132, 134, 136. The occurrence of a normally non-winning outcome is shown as step 520. If such a normally non-winning outcome occurs then in step 522, the slot machine 100 increments the player's credits based on the payout information in the reverse payout table 146*c*. Specifically, the CPU 110 accesses the reverse payout table 146*c* to identify the Player win/loss amount 336 corresponding to the particular outcome and pay combination. The CPU 110 proceeds to adjust the stored credits accordingly, in this example adding six coins to the player's credit balance.

Regardless of whether a normally winning or normally losing outcome occurs, in step 524 the player decides whether or not to continue playing in the reverse payout mode. If the player decides to continue playing in a reverse payout mode, then the operation continues from step 512. On the other hand, a player may decide not to continue playing in the reverse payout mode. For example, a player may perceive his or her luck is improving or that the slot machine 100 is "due to hit" or "getting hot." Thus, in step 526, rather than leaving the machine, the player uses the payout selector 144 to select normal payout mode.

In an alternate embodiment, the slot machine 100 includes only the reverse payout table 146*c* and not the normal payout table 128*b*. With such a slot machine 100, the normally winning outcomes, although not identified in any normal payout table, are typically pre-determined and identified to the player in the form of a display. As in the previously described embodiment, the embodiment having only a reverse payout table will prevent a player from stopping play or leaving the casino based on perceived bad luck. In such an embodiment, the slot machine operates as described above with reference to steps 512-524 of FIG. 5*b*.

An alternate embodiment will now be described with reference to FIGS. 6-11, and with continuing reference to FIGS. 1-3*d*. In general, some alternative embodiments of the present invention allow a player to wager on the play of a slot machine in reverse payout mode without relying solely on credits stored at or coins deposited into the slot machine 100. Instead, the player uses a player tracking card that identifies a credit balance stored by a slot network server. The information stored by the server may include a credit balance, a credit card number, a complimentary points awarded total, a total associated with the charge balance of a hotel room, and the like. This information may be used, for example, as a source of funds or points for a player to wager.

More specifically, such an embodiment includes multiple slot machines 100 in communication with a slot network server 600 via a conventional local area network (slot network) 602. The slot network 602 is controlled by the slot network server 600. It is to be understood that communication between each slot machine 100 and the slot network server 600 may also occur across a wireless network or Internet connection. A cashier terminal 612 is also coupled to the slot network server 600.

As will be discussed in greater detail below, each slot machine 100 communicates outcome data to the slot network server 600. As used herein, outcome data includes all game activity-related information, which is being passed from a slot machine 100 to the slot network server 600. In one or more embodiments of the present invention, such outcome data includes the Number of coins wagered, the Player win/loss amount, and the position of the reels 132, 134, 136 on the slot machine 100. Thus, outcome data includes any given outcome and the payout information for that outcome. As discussed below, in an alternate embodiment, such outcome data also includes an indication of which payout mode, either normal or reverse, the slot machine 100 is operating in. It will be understood that the position of the reels 132, 134, 136 and the payout information are essentially alternate representations of the same data.

Because each slot machine 100 has a unique machine identification (ID) number, the slot network server 600 is able to distinguish the outcome data as being sent from a particular slot machine 100 and to store the outcome data with reference to that particular machine 100.

To facilitate the communication between a player, the slot machine 100 and the slot network server 602, a casino typically issues a player tracking card containing player-identifying information. Such identifying information can be any information that uniquely identifies a player to the system and, in various embodiments of the present invention, includes the player identification (ID) number. The identifying information is preferably stored on a magnetic strip on the player tracking card.

The player tracking card reader 166 reads the player identifying information from the player tracking card and communicates the information to the CPU 110, which in turn communicates the identifying information to the slot network server 600. Because the player identifying information uniquely identifies a given player, the slot network server 600 is able to access information associated with that player, such as a credit balance.

Figure 7:
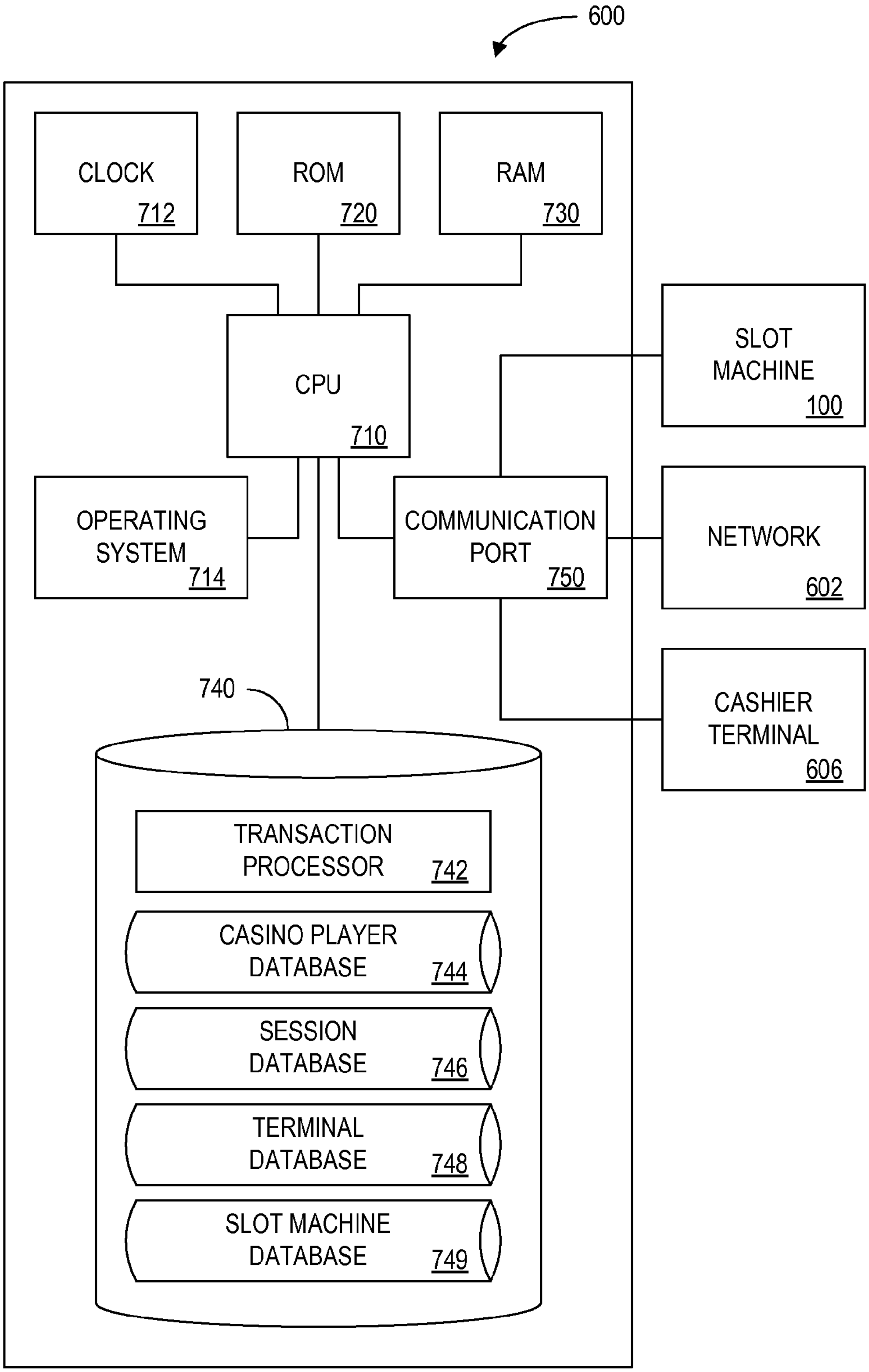
FIG. 7 is a schematic view of an exemplary slot network server according to one or more embodiments of the present invention.

With reference to FIG. 7, the slot network server 600 will now be described in greater detail. Like the slot machine 100 of FIG. 1, the slot network server 600 has a Central Processing Unit (CPU) 710. The CPU 710, which has a clock 712 and operating system 714 associated therewith, executes instructions of a program stored in either Read Only Memory (ROM) 720 or Data Storage Device 740. During execution of the program instructions, the CPU 710 temporarily stores information in the Random Access Memory (RAM) 730.

In order to communicate with the cashier terminal 606, the slot network server 600 also includes a communication port 750. The communication port 750 is coupled to the CPU 710, as well as to the slot machine network 602 and the cashier terminal 606. Thus, the CPU 710 can control the communication port 750 to receive and transmit information from each slot machine 100, and the cashier terminal 606.

Additionally, the CPU 710 is coupled to a data storage device 740, having a transaction processor 742, a casino player database 744, a session database 746, a terminal database 748, and a slot machine database 749. In general, the transaction processor 742 manages the contents of the data storage device 740, and may comprise a dedicated processor, or a portion of the function of processor 710.

In general, the exemplary casino player database 744, as shown in FIG. 8, includes multiple records having multiple fields of information related to player identification. Specifically, the player database 744 comprises multiple records, each record being associated with a particular player, as identified by a player identification (ID) number. The fields within each record include: name 7440, player ID number 7442, player address 7443, credit card number 7445, credit balance 7446, complimentary information 7447 (such as complimentary points accumulated), and player status rating 7449. Having information related to one field, such as player ID number 7442, allows the slot network server 600 to index all information stored in the other fields of that player's record.

It is to be understood that for purposes of some embodiments of the present invention, only the player ID number field 7442, and the credit balance field 7446 are necessary. The remaining fields are merely representative of additional information that may be stored and used for other purposes. For example, credit card number 7445 is used for billing purposes and address 7443 is used to mail casino promotions to players to provide incentives to them to return to the casino.

The slot machine database 749 relates to information concerning particular slot machines 100. As illustrated in FIG. 9, each slot machine 100 has an associated record in the database identified by a machine ID number, as stored in the machine ID number field 7491. The other fields in the slot machine database 749 include: player ID number 7492, payout 7494, amount wagered 7497, payout mode 7498, and payout table identifier 7499.

Figure 10:
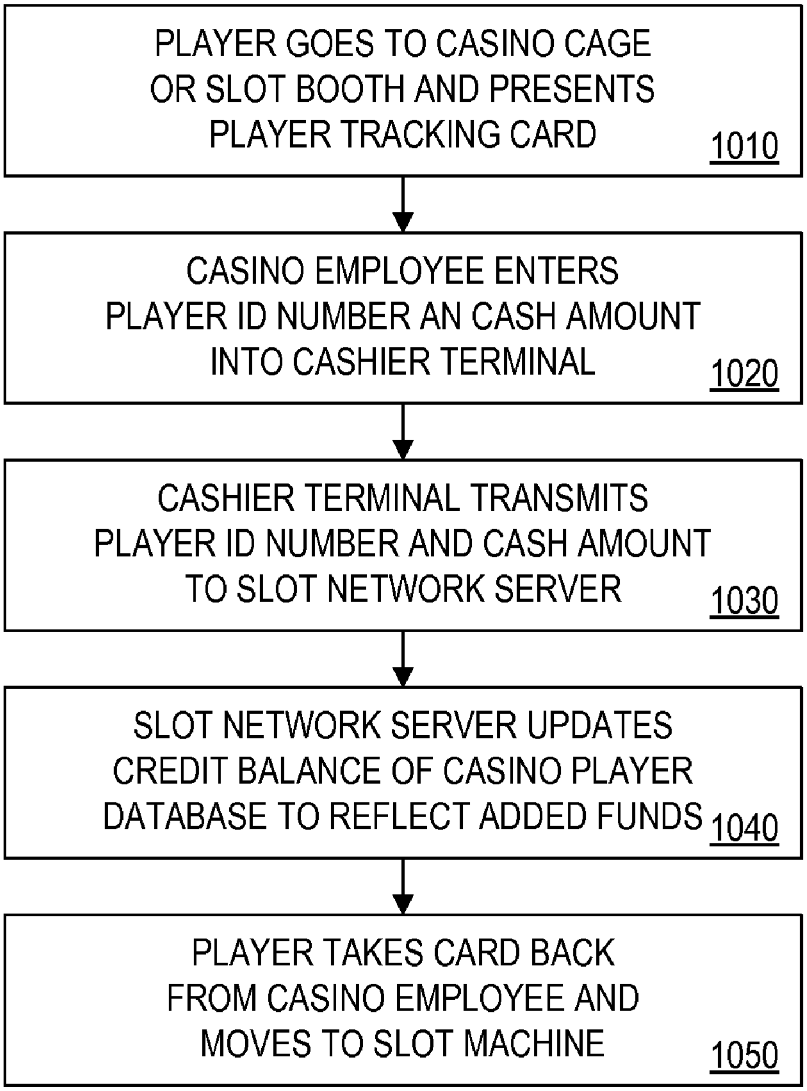
FIG. 10 is a flow diagram describing an exemplary process for the depositing of funds according to one or more embodiments of the present invention.
Figure 11:
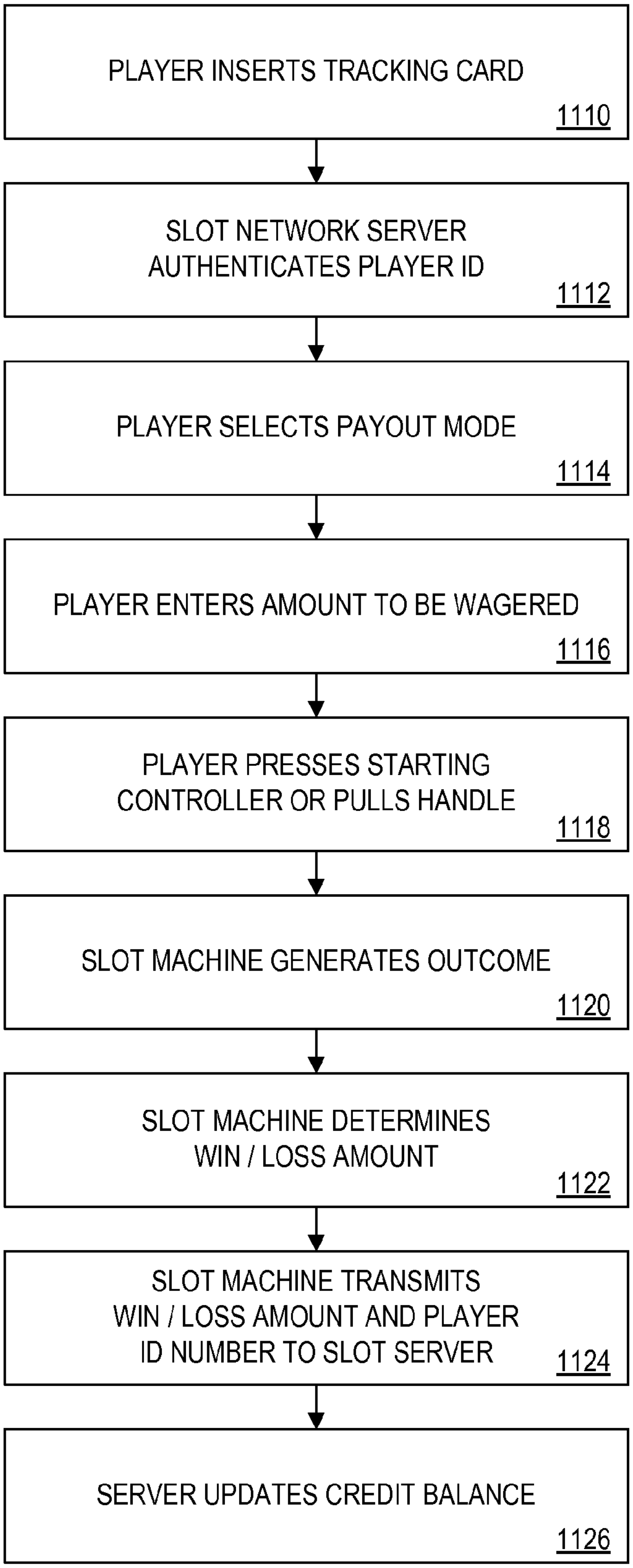
FIG. 11 is an overall flow diagram of an exemplary process according to one or more embodiments of the present invention.

Having thus described the components of the slot machine 100 according to some embodiments of the present invention, the operation of the system 604 will now be described in greater detail with reference to FIG. 10, and continuing reference to FIGS. 1, 2*a*-*c*, 3*a*-*d*, 5*a*, 5*b* and 6-9. It is to be understood that the programs stored in ROM 720 of the slot network server 600 and ROM 116 of the slot machine 100 provide the function described below.

The process of adding funds to the player's credit balance 7446 will now be described with reference to FIG. 10. Initially, in step 1010, the player goes to a casino cage or slot booth and presents the player tracking card to a casino employee. The casino employee proceeds, in step 1020, to read the player identifying information, namely the player ID. The casino employee then enters the player ID and the amount of funds being deposited by the player into the cashier terminal 606. Alternatively, the player provides a credit card number to which any losses can be charged by the casino.

In step 1030 the cashier terminal 606 transmits the player ID and the amount of funds deposited to the slot network server 600. Once the server 600 receives the player ID and the amount of funds deposited, the server CPU 710 causes the transaction processor 742 to access the casino player database 744. More specifically, the transaction processor 742 searches the casino player database 744 for the record containing the received player ID in the player ID field 7442. Having thus located the appropriate record, in step 1040, the transaction processor 742 increments the credit balance field 7446 by the amount of funds deposited. Once the player database 744 has been updated, the player takes the player tracking card back from the casino employee in step 1050 and proceeds to the slot machine 100.

The player does not have to use cashier terminal 606 to add money to credit balance 7446. Instead the player may provide money or account data directly into slot machine 100, which in turn transmits the credit data to slot server 600. In such embodiments, the slot machine 100 could be equipped with either a smart card or credit card reader. The player is making these funds available such that any losses sustained while playing the reverse mode on the slot machine 100 will be covered by those funds prior to the actual loss. Initiation of play will now be described with reference to FIG. 11 and continuing reference to FIGS. 1, 7, 8 and 9.

Having thus established a credit balance 7446, the player may initiate play of a slot machine 100. The CPU 110 transmits a signal to the slot network server 100 indicating funds have been received.

As shown as step 1110, the slot machine player first inserts the player tracking card into the card reader 166. The card reader 166 then proceeds to read the player identifying information from the tracking card. The player identifying information, namely the player ID, is communicated from the slot machine 100 to the slot server 600. Upon receiving the player identifying information, the slot server 600 authenticates the information. This step, depicted as step 1112, includes the slot network server 600 searching the casino player database 744 for a record containing the received player ID in field 7442. The server 600 also stores the player ID number in the field 7492 of the record in the slot machine database 749. Once the slot network server 600 authenticates the player identifying information, the server 600 may transmit a signal to the slot machine 100 acknowledging such authentication.

In step 1114, displayed on either display 162 or video display area 138, the player selects either normal payout mode or reverse payout mode on the payout selector 144. This selection may be prompted by a message from slot machine 100. The slot machine 100 also prompts the player to enter the amount to be wagered on the upcoming play. Specifically, as shown in step 1116, the player enters the number of coins to be wagered into the keypad 164, or, in an alternate embodiment, a touch screen of the video display area 138 or use of buttons. The slot machine 100 registers the amount to be wagered by the player and stores the value in the RAM 118.

Having selected the payout mode and entered the amount to be wagered, the player presses the starting controller 122 or pulls the handle to begin play in step 1118. As discussed above, the slot machine 100 generates an outcome based upon a number randomly generated by random number generator 120, the random number corresponding to a reel combination in probability table 126. Once the slot machine 100 generates an outcome, which is shown as step 1120, it determines the appropriate player win/loss amount. Specifically, in step 1122, the CPU 110 accesses either the normal payout table 128*c* or an appropriate reverse payout table such as 146*a* or 146*d*, and correlates the outcome to the player win/loss amount as stored in fields 226, 326, 346 respectively, depending on the mode of play and the appropriate reverse payout table. It should be noted that instead of accessing the Player win/loss field, slot machine 100 could access the Number of coins awarded field in the appropriate payout table to determine the payout to the player.

The slot machine 100 transmits the number of coins awarded information and player ID number to the slot network server 600 in step 1124. Having received the Player win/loss amount and the player ID number, the slot network server 600 proceeds to update the player's stored credit balance.

Updating the player's credit balance, shown as step 1126, involves the CPU 710 directing the transaction processor 742 to access the casino player database 744 in order to locate the record containing the received player ID number in field 7442. The transaction processor 742 then adjusts the value stored in credit balance field 7446 by the received Player win/loss amount.

Once the slot network server 600 has adjusted the player's credit balance accordingly, operation of the system 604 may repeat from step 1114 until either the server 600 determines the player has insufficient funds stored in the credit balance 7446 to play or the player decides to stop playing and removes the tracking card from the card reader 166.

If the player stops playing and desires to cash out, the player merely goes to the casino cage or slot booth and presents his tracking card. As with the depositing of funds, described above, the server 600 accesses the player's record and adjusts the credit balance field 7446. Rather than incrementing the credit balance 7446, however, the slot network server 600 decrements the stored value by the amount dispersed by the casino employee to the player.

Figure 12:
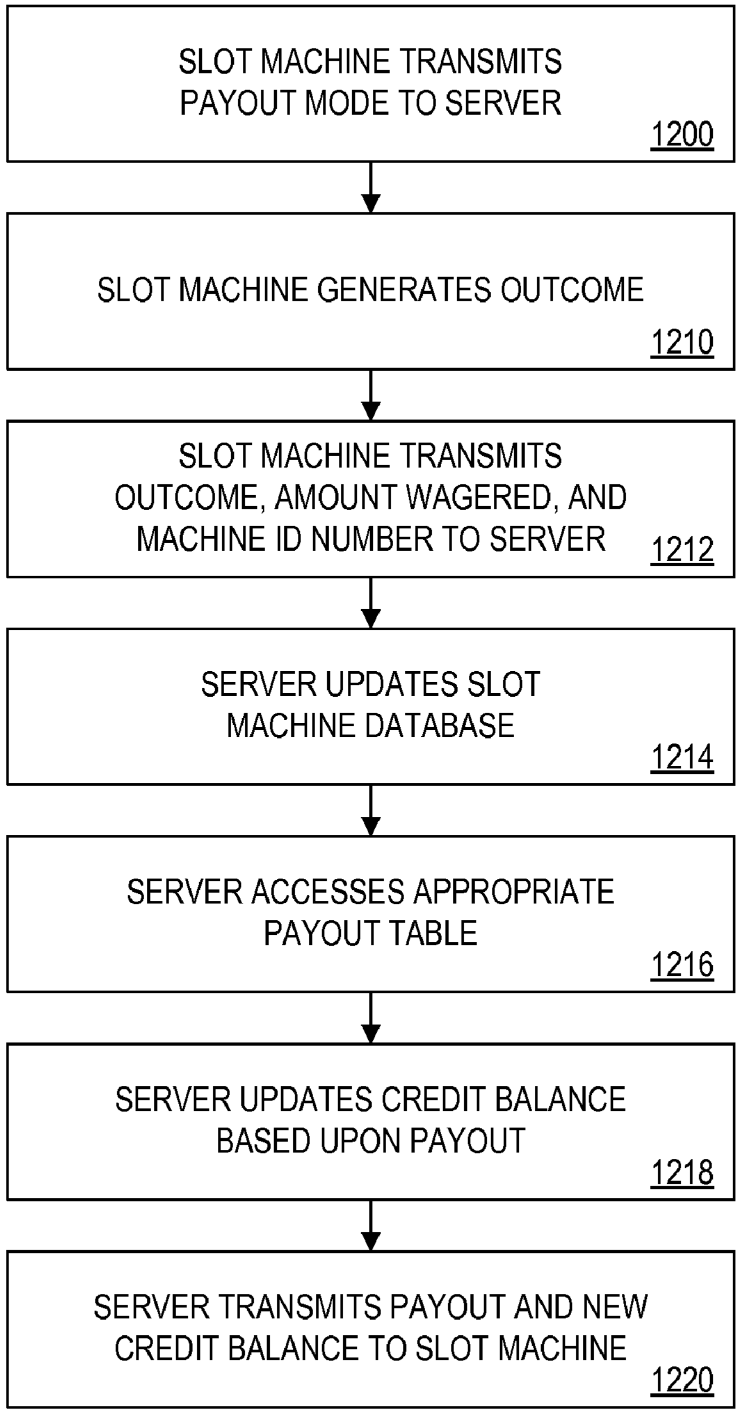
FIG. 12 is an overall flow diagram of an exemplary process according to one or more embodiments of the present invention.

An alternate embodiment employing the system 604 will now be described with reference to FIG. 12 and continuing reference to FIGS. 1, 2*a*-*c*, 3*a*-*d*, and 7-9. In this embodiment, the slot machine 100 does not contain payout tables. Instead, the payout tables are stored in the slot network server 600. As noted above, the slot machine database 749 contains a payout mode 7498 which identifies what mode of play, normal or reverse, slot machine 100 is operating in. Furthermore, because the payout tables are stored at the slot network server 600, the same payout tables may be used by multiple slot machines 100. In such an arrangement, the slot machine database 749 would contain a payout table identifier 7499 to a location in memory, such as the data storage device 740 or the RAM 730, where the appropriate payout table is stored. Thus, the slot machine database 749 at least indirectly contains payout information.

Initially, in step 1200, the slot machine 100 transmits an indication of the payout mode selected by the player to the slot network server 600. The slot network server 600 stores this indication in the payout mode field 7498 of that particular slot machine's record in the slot machine database 749. As with the previously described embodiments, the slot machine 100 then generates a random number and a corresponding outcome, for example, reel positions, in step 1210. In step 1212, the slot machine 100, having generated an outcome, transmits the outcome to the slot server 600. Along with the outcome, the slot machine 100 transmits the amount wagered and the machine ID number so that the slot server 600 can identify from which machine the outcome originated.

Once the slot network server 600 receives the outcome and amount wagered, it updates the slot machine database 749 in step 1214. More specifically, the slot network server 600 accesses the slot machine database 749 and updates the record pertaining to the particular slot machine 100, as identified by its machine ID number 7491, with the amount wagered 7497.

After updating the slot machine database 749, the slot server 600, proceeds to update the credit balance field 7446 in the player's record having the same player ID number in field 7442 as found in the player ID number field 7492 of the slot machine database 749. The credit balance field 7446 is adjusted by the player win/loss amount from the appropriate payout table.

Specifically, the server 600 determines the payout by retrieving the address stored in either the payout mode field 7498 or the payout table indicator field 7499. The CPU 710 then accesses the payout table stored at the retrieved address in RAM 730 or Data Storage Device 740 and, based upon the stored outcome 7493 and amount wagered 7497, retrieves the corresponding payout. Accessing the payout table is shown as step 1216. The CPU 710 then in step 1218 causes the transaction processor 742 to adjust the credit balance field 7446 by the amount of Player win/loss 7494.

Once the server 600 determines the player win/loss and adjusts the player's credit balance 7446, the server 600 transmits the player win/loss amount and the new credit balance 7446 to the slot machine 100 for display to the player in step 1220.

It is to be understood that reverse payout tables other than those shown in FIGS. 3*a*-3*d* are within the scope of the present invention. Such other reverse payout tables include payout schedules which are more or less favorable to the player, or schedules which result in a greater frequency of positive payouts in exchange for larger losses for the remaining losing outcomes and are based on different amounts of coins wagered.

Alternatively, the present invention can also substitute the use of algorithms for reverse payout tables 146*a-d*. One such algorithm is applied to the Player win/loss fields 216, 226, 236 of normal payout tables 128*a-c*, and may be stored in data storage device 124 or ROM 116 of slot machine 100. The algorithm takes the normal Player win/loss 216, 226, 236 as an input and returns the corresponding reverse Player win/loss 316, 326, 336, 346. The algorithm looks like the following:

1. If the normal player win/loss is a win of greater than five coins, then the reverse player win/loss is a loss of five coins.

2. If the normal player win/loss is a win of between zero and five coins, then the reverse player win/loss is a loss of two coins.

3. If the normal player win/loss is zero or a loss of some number of coins, then the reverse player win/loss is a win of one coin.

Another algorithm takes the Number of coins awarded 212, 222, 232 of one of the normal payout tables 128*a-c* as an input and returns the Player win/loss 316, 326, 336, 346 of one of the reverse payout tables 146*a-d*.

1. If the normal Number of coins awarded is greater than zero, then the reverse Player win/loss is a loss of one fewer coins.

2. If the normal Number of coins awarded is equal to zero, then the reverse Player win/loss is a win of one coin.

The above described payout results may also be produced by altering the probability of each pay combination as depicted in any of the normal payout tables 128*a-c*. In this manner, pay combinations with high or medium payouts have their probability of hitting lowered, while pay combinations of low end payouts have their probability increased.

Another way to shift the odds in favor of the house is to alter the probabilities of the outcomes. Specifically, the probability table 126 is adjusted so that normally winning outcomes, which result in a loss to the player, are more likely while normally non-winning outcomes, which result in a payout to the player, are less likely while in reverse payout mode.

It is to be understood that the normal payout tables 128*a-c* and the reverse payout tables 146*a-d* may include some of the same Player win/loss amounts. For example, in an alternate embodiment using the reverse payout tables of FIGS. 13*a* and 13*b*, the payout for the least likely outcome (and the highest jackpot)—"7-7-7"—is positive in both the normal payout tables 128*a-c* and reverse payout tables 1300*a-b*. By retaining the highest positive win in the reverse payout tables 1300*a-b*, players will be further encouraged to play the slot machine 100 in reverse payout mode knowing that winning the highest jackpot is still possible. Further in this regard, it is within the scope of the present invention to make other jackpots available in the reverse payout table 1300 and to make one or more jackpots available in any of the reverse payout tables described herein.

It is also to be understood that embodiments in which players make non-monetary wagers are also within the scope of the present invention. Thus, in one embodiment, a player wagers complimentary points, as stored in the "COMP-.INFO" field 7447 of the casino player database 744. Such an embodiment operates similar to the system 604 described above with the exception that the payouts relate to complimentary points, not coins, and the "COMP.INFO" field 7447, not the credit balance field 7446, is adjusted based upon the payouts. Upon a player cashing out, the casino could convert the accumulated complimentary points into any kind of award, including free hotel rooms, dinners, tickets to shows, free plays on a gaming device, money, and the like.

In one or more embodiments in which the gaming device is a video poker machine, card values typically represent the outcome display instead of reel symbols. In a typical video poker game, the player receives five cards and then has the option to draw five new cards. The resulting completed hand is paid according to a payout schedule that typically rewards rare hands such as a royal or straight flush with a large coin award. Hands like a full house or flush receive medium payouts while a small pair or no pair hand generally earns the player no payout at all. In a reverse payout table, players are rewarded for low value hands. Much like lowball poker, the player is rewarded for having the worst hands.

FIGS. 14-18 illustrate various embodiments of the present invention related to play of video poker games in a reverse payout mode. FIG. 14 illustrates an exemplary normal payout table 400 for use with a video poker game. As depicted in FIG. 14, the normal payout table 400 is for use with a full-pay Jacks or Better 6/9 video poker game. The payouts represent the amount of money returned to the player for each coin wagered. For example, a player wagering a single dollar coin who achieves a full house would be paid $9.

FIG. 15*a* illustrates a reverse payout table 401 in which the player is paid only for otherwise losing poker hands. In this example, any hand that is a pair of tens or lower (i.e. a small pair or high card only) pays $6, while all other possible final hands (e.g., flush, straight, four of a kind) pay nothing to the player. Because tens or lower is a common result in Jacks or Better video poker, and because the player can intentionally throw away good cards in an attempt to achieve a bad hand, the player may be forced to put up five coins in order to play video poker with this exemplary reverse payout table.

In order to determine what an appropriate payout level is for tens or lower, a Monte Carlo simulation could be run to determine the approximate odds of achieving tens or lower. The amount of money risked by the player may then be adjusted relative to the payout amount, until the final configuration of the reverse payout table 401 results in a reasonable hold percentage for the casino. Alternatively, optimal play could be calculated for all possible initial hand combinations, leading to an exact calculation of the probability of attaining tens or lower with perfect play. Such an exact probability could then be used as described in the Monte Carlo simulation. Note that results of such a simulation would reflect perfect play, and that actual play by casino customers could result in even higher hold percentages for the game.

FIG. 15*b* illustrates an alternative reverse payout table 401 in which there are a number of distinct possible low hands that would pay different amounts to the player. For example, a hand of "7 High" pays $20 while a "5-4-3-2-A" pays $100 (note that in this particular embodiment, straights and flushes are ignored for the purposes of determining a low hand). Any hand higher than a "9 high" would pay nothing. Preferably, a player would be able to switch between this reverse payout table 401 and a normal payout table 400 during the course of a gaming session.

Figure 16:
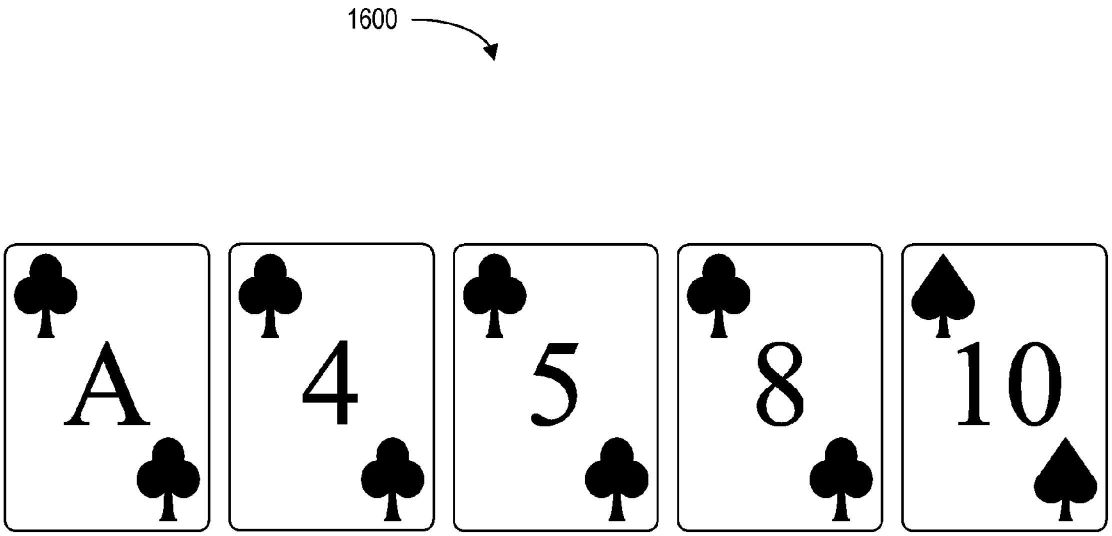
FIGS. 16-18 depict an example of play of a video poker game in a reverse payout mode according to one or more embodiments of the present invention.
Figure 17:
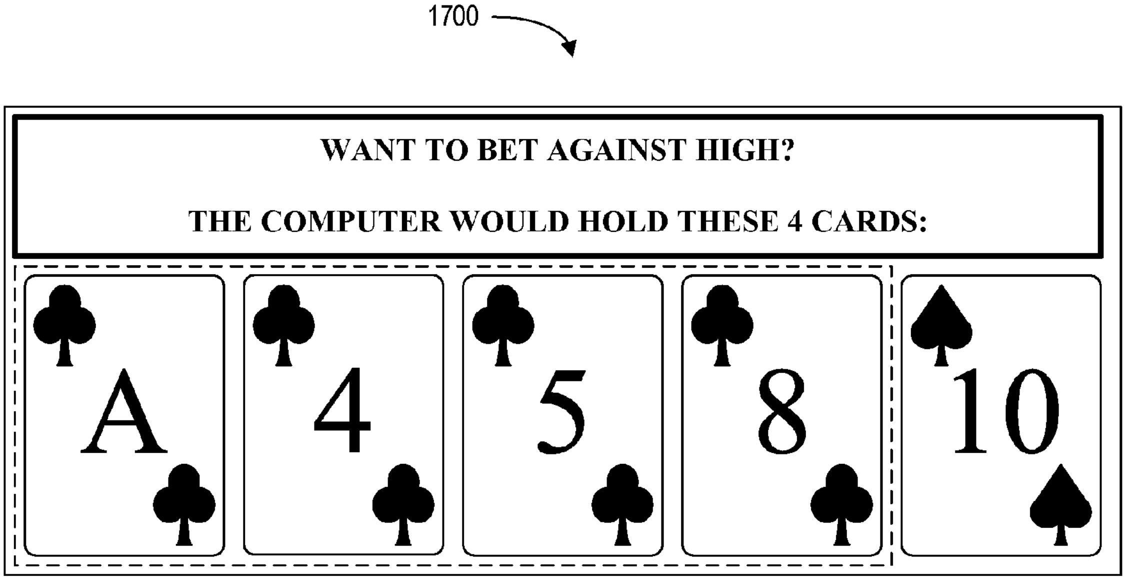
Figure 18:
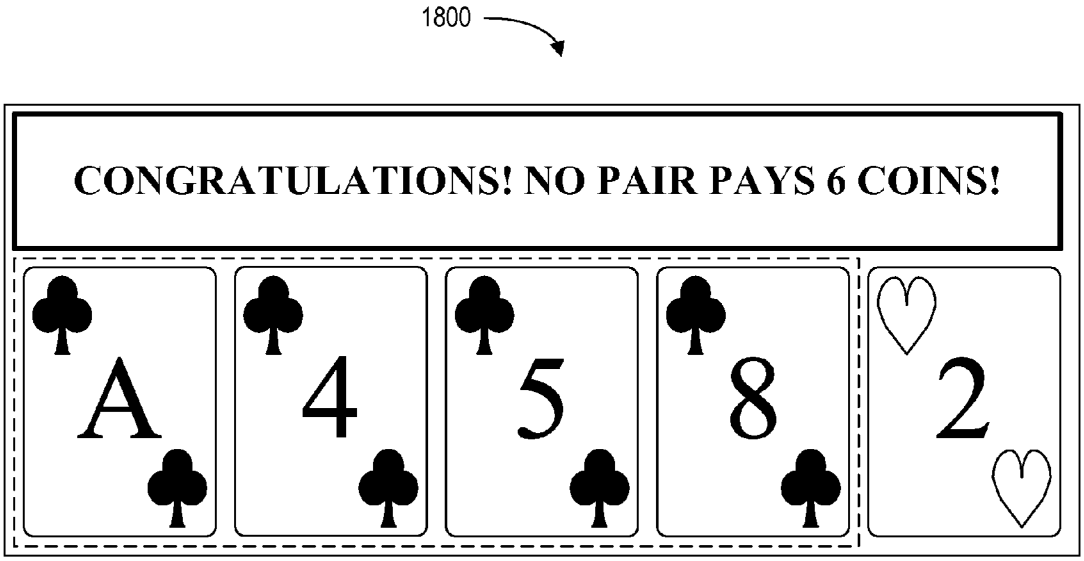

One example of play of a video poker game in accordance with one or more embodiments of the present invention is illustrated in FIGS. 16-18. FIG. 16 depicts an exemplary initial hand 1600 of video poker dealt to a player. The initial hand 1600 comprises the ace of clubs, four of clubs, five of clubs, eight of clubs, and ten of spades. Based on this hand, the player might contemplate holding the four of clubs and drawing one card to the flush, but may hesitate to do so if he has been having poor luck, for example.

FIG. 17 depicts an exemplary display 1700 at the slot machine 100, in which the slot machine 100 prompts the player whether he wants to play the hand in a reverse payout mode by displaying the message: "Want to bet against high?" (e.g., in the video display area 138, at the overlay device 139). The player may accept or reject the displayed offer in a manner known in the art (e.g., by actuating an appropriate button of the slot machine 100). To prevent the player from holding only cards that would help him achieve a low value hand, during play in reverse payout mode the slot machine 100 preferably determines which cards of the initial hand will be held. The slot machine 100 thus selects one or more cards to hold, for example, based on a determination of the draw strategy with the highest expected value, as discussed herein. In some embodiments, the slot machine 100 may also indicate to the player which cards, if any, will be held. In this example, the four cards to the flush are to be held (as indicated in FIG. 17 by the dashed border surrounding the four clubs).

FIG. 18 shows an exemplary final hand 1800 resulting from the draw, which in this example was a Two of hearts. Because the final hand 1800 qualifies for a payout in accordance with the exemplary reverse payout table 401 of FIG. 15*a*, slot machine 100 preferably displays a message (e.g., in the video display area 138): "Congratulations! No pair pays 6 coins!"

While in the above example the player decided to play in reverse payout mode only after seeing his initially dealt hand, according to some other embodiments of the present invention, the player may be prompted and/or request to select a payout mode before the initial hand is dealt, and/or even after one or more draw cards are provided to the player. A player may be given multiple opportunities to select a payout mode, and in some embodiments may elect different modes within the same round of play.

Figure 19:
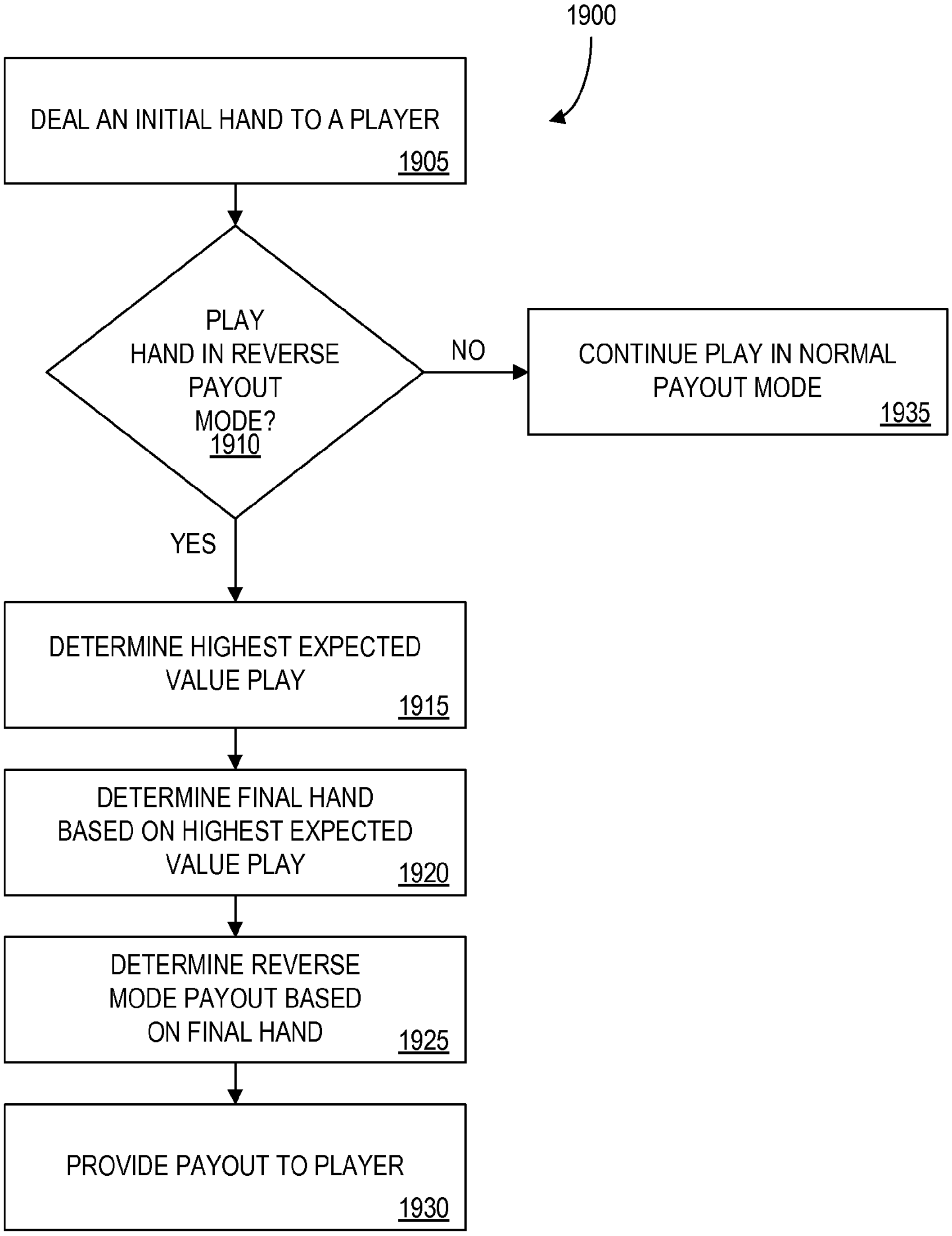
FIG. 19 is a flow chart representing an exemplary process according to one or more embodiments of the present invention.

Referring to FIG. 19, a flow chart 1900 represents an exemplary embodiment of the present invention that may be performed by a gaming device, including, without limitation, a video poker machine.

The video poker machine deals an initial hand to a player (step 1905). For example, the player places a wager at a Jacks or Better 6/9 video poker machine and actuates a "DEAL" button, and in response the video poker machine displays five cards of the initial hand in a video display area 138. In some alternative embodiments, the player may not place a wager until after viewing the initial hand, or may place an additional wager after viewing the initial hand (e.g., when selecting a payout mode, as discussed herein). The video poker machine determines whether the player wants to play in reverse payout mode (step 1910). For example, the player actuates a button either before or after viewing the initial hand. In another example, the video poker machine provides an offer to the player to play the hand in reverse payout mode, and receives a response from the player. For instance, the video poker machine may provide a visual and/or audio message or prompt to the player, asking the player if he would like to bet that the final hand will be a "low hand", and the player may respond by actuating a button (e.g., an "ACCEPT" button, a "NO" button). In some alternative embodiments, the player may place a wager after deciding what payout mode he would like to pursue, or may be required to place an additional wager (e.g., if a first wager was made before the initial deal).

If the player wants to continue play in reverse payout mode, the gaming device preferably determines the highest expected value play based on the initial hand (step 1915). For example, the video poker machine may determine which cards of the initial hand to hold (and/or which cards to discard). Some techniques for determining the highest expected value play are discussed herein, and others may be readily apparent to those skilled in the art. According to some embodiments of the present invention, the gaming device may rank possible plays or strategies according to their respective expected value. In some embodiments, the gaming device will use the highest expected value play (i.e. the highest ranked play in terms of expected value). In some alternative embodiments, the gaming device may use a strategy that is associated with the highest expected value. For example, the gaming device may select the second highest expected value play, or any other play, or may select a play at random from a set of plays having the top five highest expected values, or any other set of plays.

The video poker machine determines a final hand based on the highest expected value play (step 1920) and determines a reverse mode payout for the player based on the final hand (step 1925). For example, based on the highest expected value play, the video poker machine may discard one or more cards and then deal replacement cards for any cards that are discarded, in a manner known in the art, to determine a final hand. To determine the reverse mode payout for the hand, the video poker machine preferably compares the final hand to a reverse payout table (such as those depicted in FIGS. 15*a* and 15*b*). The video poker machine provides the determined payout to the player (step 1930). However, if it is determined that the player does not want to play in reverse mode (step 1910), then play continues in normal mode (step 1935).

As discussed variously herein, in accordance with some embodiments of the present invention, a gaming device, such as a slot machine or a video poker machine, is operable to determine payouts according to an alternate, or reverse, payout table. According to some embodiment of the present invention a gaming device randomly generates one of many possible outcomes for each play. The gaming device includes a wager selector indicating a wager, a memory device and a payout selector. The memory device stores a normal set of data correlating possible outcomes to a normal set of payout information and a reverse set of data correlating possible outcomes to a reverse set of payout information. The reverse set of payout information describes payouts consisting of amounts that are less than or equal to twice said wager. The payout selector indicates which set of data, the normal or reverse set of data, the gaming device is to access.

According to various embodiments of the present invention a gaming device randomly generates one of many possible outcomes for each play and includes a wager selector indicating a wager, a memory device and a payout selector. The memory device stores a normal set of data correlating possible outcomes to a normal set of payout information and a reverse set of data correlating possible outcomes to a reverse set of payout information. The reverse set of data includes two subsets: a first subset of outcomes which correspond to payout information describing positive payout amounts in both the normal and reverse sets of data and a second subset of outcomes which correspond to payout information describing payouts consisting of amounts which are less than or equal to twice the wager. The payout selector indicates which set of data, the normal or reverse set of data, the gaming device is to access.

According to some embodiments of the present invention, a gaming device randomly generates one of many possible outcomes for each play and includes a wager selector indicating a wager, a memory device and a payout selector. The memory device stores a normal set of data correlating possible outcomes to a normal set of payout information and a reverse set of data correlating possible outcomes to a reverse set of payout information. The reverse set of data describes winning outcomes and losing outcomes wherein the ratio of winning outcomes to losing outcomes is greater than one.

In one or more embodiments of the present invention, a method for operating a gaming device includes the steps of identifying a wager, storing a normal set of data correlating possible outcomes to a normal set of payout information, and storing a reverse set of data correlating possible outcomes to a reverse set of payout information. The reverse set of payout information describes payouts consisting of amounts that are less than or equal to twice the wager. The method also includes the step of identifying a data set selection indicating which set of data, the normal or reverse set of data, the gaming device is to access. The method further includes the steps of generating a random resultant outcome and determining a resultant payout based on the wager, the data set selection and the resultant outcome.

According to one or more alternative embodiments of the present invention, overlay device 139 may be used to display video entertainment to a player. For example, during a gaming session at slot machine 100, video images from broadcast or cable television sources may be projected onto overlay device 139. In this way, a player is able to watch his favorite television program while simultaneously being able to view the resolution of reels 132, 134, and 136 (e.g., viewable through the overlay device 139). The broadcasting of sporting events, for example, might be particularly helpful to players who had made sportsbook wagers on their favorite sports teams. For instance, rather than having to look up toward ceiling-mounted television monitors, a player could enjoy a game without interrupting his slot machine session. In some embodiments, the player could even be offered the opportunity to watch three different sports games at the same time, with each game appearing over one of the reels 132, 134, and 136. Other types of information and entertainment content that may be displayed to a player will be recognized by one of ordinary skill in the art after reading the present application.

In some other embodiments of the present invention, text messages may be displayed on overlay device 139 (e.g., scrolling across the display) to entertain or inform the player. For example, a player might be presented with a menu of major league baseball games currently in action. The player selects one of the games, and a scrolling "ticker" of game information rolls across overlay device 139 while he plays slot machine 100. For example, such an information stream might be taken from the closed captioning data stream of the broadcast signal, or could be received from a third party providing live game updates. Similar information scrolling embodiments could be used to display headline news updates, stock tickers, and the like. Such information could of course also be presented in a more static embodiment. For example, a joke of the day/hour, or horoscope, could be displayed. A horoscope could even be personalized for the player's birth date (e.g., retrieved from the player database 744 of the slot network server 600). In a sports-related embodiment, players could store current sports bets with the slot network server 600. In this way, a player at slot machine 100 could be updated with the current status of each bet as the games progressed, via overlay device 139.

In yet another embodiment, statistics related to a gaming session may be displayed to a player via overlay device 139. For example, the player could view a graph representing his win/loss for the last trailing half hour of play on the slot machine 100, allowing him to make better decisions as to whether the machine is "hot" or "cold." Other statistics could be displayed, such as the length of the longest win streak for the current gaming session, the number of times that a particular outcome had been achieved, the number of times that a flush draw in video poker had been successful, the number of times that a bonus round had been reached in the last hour, etc. Other types of game-related information that may be displayed to a player will be recognized by one of ordinary skill in the art after reading the present application.

According to some embodiments, marketing information might also be advantageously displayed on overlay device 139. For example, a player playing the slot machine 100, without using a player tracking card, might trigger slot machine 100 (e.g., based on a predetermined condition monitored by the slot machine 100) to make an offer such as, "Sign up now for a player card and get a lunch buffet for free". By displaying such offers to the player via the overlay device 139, the offers may be presented directly in the line of vision of the player (e.g., as he is watching outcomes on the reels 132, 134, and 136), making it less likely that the player will miss them.

According to one or more embodiments of the present invention, play of a gaming device in reverse payout mode may be represented as if a displayed character or other virtual player were playing the gaming device (or a represented virtual gaming device) in normal payout mode. Thus, according to some embodiments of the present invention, while playing a slot machine in reverse payout mode, a player can effectively look "over the shoulder" of a computer-generated character that is depicted as playing a virtual representation of the slot machine. For example, the slot machine 100 may display (e.g., via video display area 138) a graphical virtual representation of the slot machine 100 being operated by a computer-generated character.

By representing game play in reverse payout mode in this way, the player's experience during a reverse mode session may be enhanced, making him feel even more as though he were on the side of the casino—as though he were "the house" watching the virtual "player." In addition, embodiments using such representations may be advantageous in indicating to the player that the player is playing in a reverse payout mode.

Also, some such embodiments provide the benefit that a player may play in reverse mode without requiring the gaming device to use (or even have access to) a reverse payout table.

Figure 20:
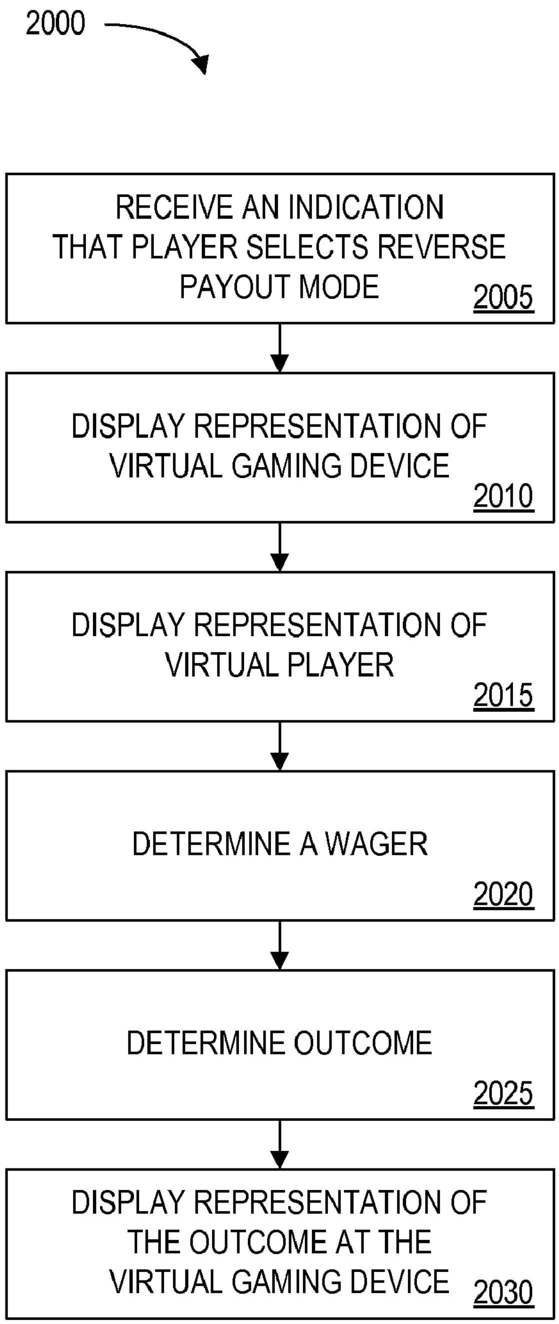
FIG. 20 is a flow chart representing an exemplary process according to one or more embodiments of the present invention.

Referring to FIG. 20, a flow chart 2000 represents an exemplary embodiment of the present invention that may be performed by a server and/or a gaming device, including, without limitation, a slot machine. The particular arrangement of elements in the flow chart of FIG. 20, as well as the other flow charts discussed herein, is not meant to imply a fixed order to the steps; the steps can be practiced in any order that is practicable for various embodiments of the present invention. Of course, not all of the exemplary steps of a flow chart need be practiced, and processes involving one or more other steps, in addition to or in lieu of the exemplary steps, may be practiced as deemed practicable for various embodiments.

The gaming device receives an indication that a player has selected reverse payout mode (step 2005). For example, the player selects reverse payout mode via payout selector 144 of a slot machine 100. Optionally, if the gaming device is a reeled slot machine, the gaming device may terminate the spinning of any reels during reverse mode. For example, CPU 110 may direct reel controller 130 to terminate the spinning of reels 132, 134, and 136 during reverse mode.

The gaming device displays a graphical representation of a gaming device (step 2010) and displays a graphical representation of a character or other virtual player (step 2015). For example, CPU 110 of the slot machine 100 directs video display area 138 to display a graphical image of the slot machine 100 (or another slot machine, or a different gaming device) and also to display a character (e.g., a cartoon character, a game character) to "play" the displayed slot machine.

Figure 21:
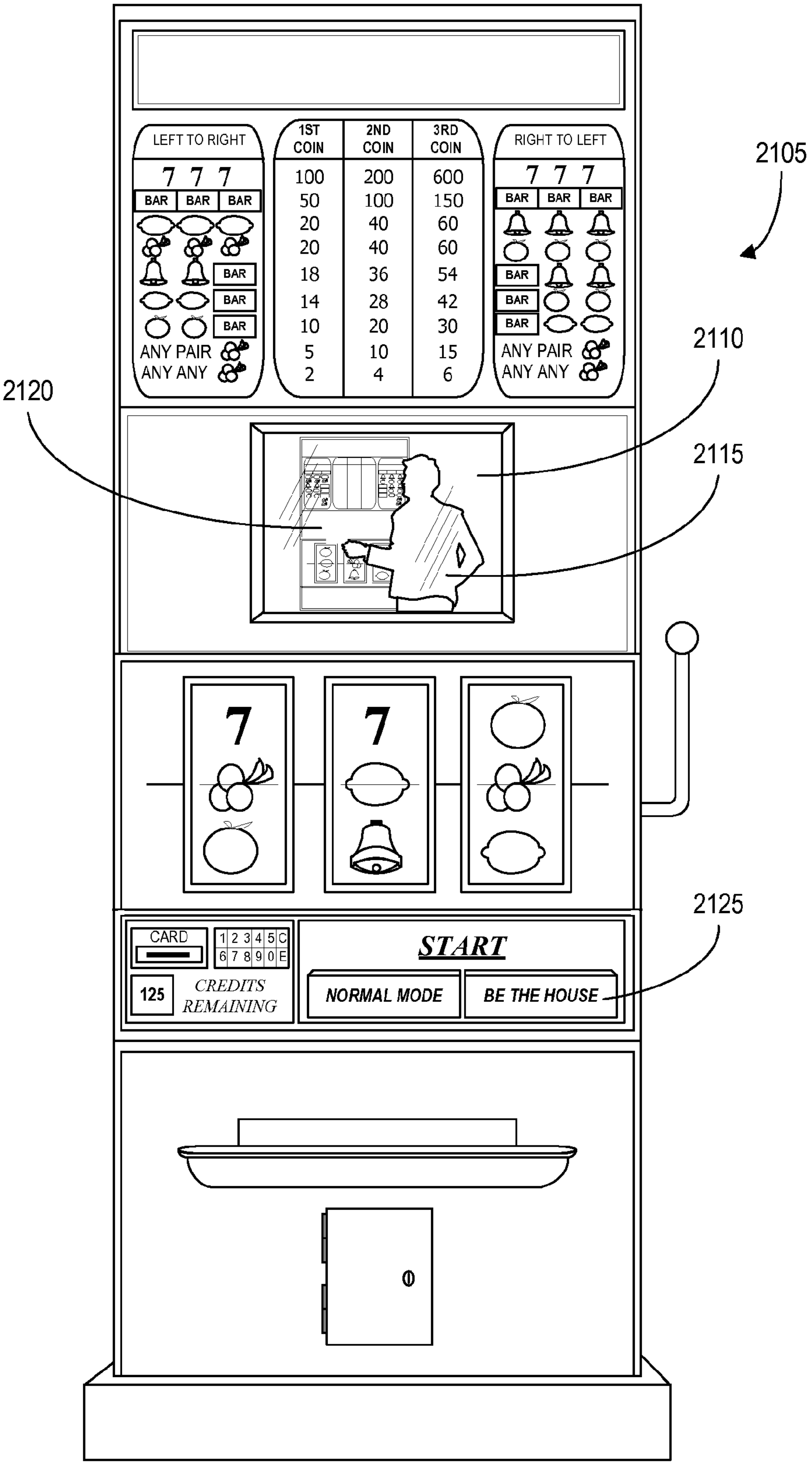
FIG. 21 is an exemplary representation of a gaming device providing play in a reverse mode according to one or more embodiments of the present invention.

FIG. 21 depicts an example of a slot machine 2100 having a video display area 2105. The video display area 2105 displays an exemplary animated representation of a virtual player 2115. The video display area 2110 also displays a virtual gaming device 2120 used to represent play by the virtual player 2115. The exemplary virtual gaming device 2120, like the slot machine 2100, is a reeled slot machine. The slot machine 2105 also includes an exemplary "Be the House" button 2110 that a player may use to indicate she would like to take a house position against a virtual player (e.g., play in a reverse payout mode). The exemplary embodiment depicted in FIG. 21 is not intended to limit the scope the present invention. Other embodiments and examples of embodiments will be readily apparent to those having skill in the art in light of the present disclosure. In some embodiments, for example, another display device or peripheral device may be used to display the virtual player 2115 and/or virtual gaming device 2120. Further, the virtual gaming device 2120 may be any of various types of gaming devices (e.g., a video poker machine). In some embodiments, as discussed herein, only the virtual player 2115 may be displayed in the video display area 2110. The actual reels of slot machine 2100 (whether electronic or mechanical), for example, may be used to represent outcomes for the virtual player 2115. The virtual character 2115 could be depicted as watching and reacting to the actual reels as they spin below the video display area 2110. In other embodiments, the virtual player may be represented only as audio messages (e.g., commenting on represented play).

Referring again to the flow chart 2000 of FIG. 20, the gaming device determines a wager (step 2020). In some embodiments, the gaming device receives an indication of a wager that the player would like to make in reverse payout mode. For example, as described variously herein, the player may indicate a number of coins to wager. The indication may be received from the player (e.g., via a button or other actuator of the gaming device) or from a server (e.g., in accordance with a preference of the player stored at the server). In another example, the gaming device may determine a set of available wagers, based on one or more predetermined wagers and/or wagers preferred by the player. An indication of the available wagers may be provided to the player (e.g., via a displayed menu) from which the player may make a selection (e.g., using a touch screen, using a pointer device).

In other embodiments, the gaming device may determine a wager that is not based on player information. For example, the gaming device may select a wager from a set of one or more predetermined wagers (e.g., "default" wagers) and/or may receive an indication of a wager to make from a server or other gaming device (e.g., via slot network interface 150).

The gaming device also determines an outcome, preferably as described above with reference to normal payout table 128 (step 2025), and also preferably displays a representation of the determined outcome at the virtual gaming device (step 2030).

For example, after the character places a wager at a represented slot machine, a reel spin is simulated at the character's virtual slot machine in video display area 138 of the slot machine 100. For instance, the player can view the reels of a virtual slot machine (e.g., "over the shoulder" of the virtual player). The reels of the virtual slot machine could be represented as spinning and displaying an outcome of a reel spin (e.g., after displaying a representation of the virtual player pushing a "SPIN" button). In some embodiments, the player may initiate the spin at the virtual gaming device. For example, the player may push a "SPIN" button of the gaming device; in response, the gaming device displays a representation of the reels of the virtual gaming device spinning, as described above. Also, in response to the player pushing a "SPIN" button or otherwise indicating he wishes the virtual player to play the virtual gaming device, the virtual player may be represented as pushing a virtual "SPIN" button on the virtual gaming device (or pulling a virtual handle, etc.).

Alternatively, for a slot machine having mechanical reels, the reels could be used in addition to or in lieu of the video display area 138 for displaying the determined outcome. Thus, instead of representing an outcome as occurring at a virtual gaming device via video display area 138, the outcome may be represented using the reels of the actual slot machine. For example, CPU 110 of slot machine 100 could direct reel controller 130 to spin reels 132, 134, and 136 to the appropriate reel stop positions to depict the determined outcome.

Optionally, the gaming device may represent the placing of the determined wager by the character during reverse payout mode. Thus, according to some embodiments of the present invention, the character may be "directed" (e.g., by the player, by the gaming device) to make a particular wager, as if the virtual player were playing a gaming device in a normal payout mode. For example, the player may indicate a six-line wager at two coins per line, using the wager selector 153 of the slot machine 100. In response, the slot machine 100 may display an animated sequence of the character making a six-line wager at two coins per line, at a represented slot machine.

As described variously herein, in accordance with play in reverse payout mode, a normally winning outcome for a simulated character is a losing outcome for the player. Thus, the player is effectively bankrolling a represented gambling session of the virtual player. According to some embodiments of the present invention, if a virtual player receives a normally winning game outcome, then the gaming device subtracts the corresponding payout amount from the player's credit balance. For example, if a virtual player receives an outcome of "CHERRY-CHERRY-CHERRY," then CPU 110 of the slot machine 100 subtracts twenty coins from the credit balance of the player stored in RAM 118. Similarly, if a character "loses his wager" (e.g., the slot machine generates a normally losing outcome), the wager amount may be added to the credit balance of the player.

In some embodiments, to make it more apparent that the player is acting as the house in a reverse payout session, credits subtracted from a player's credit balance may be represented, for example, as graphical coins, and graphically "loaded" into the virtual version of the gaming device. In this way, the player may feel as though his own coins are being lost when the character receives a winning outcome. Similarly, in some alternative embodiments, the player's credit balance could be increased in accordance with the number of coins wagered by the character, for example, when the character is represented as initiating a handle pull.

It will be understood, as discussed variously herein, that during reverse payout mode the player himself is not directly making the determined wager. For example, the player may direct the character to make a bet, and the player effectively backs the bet ("fades the wager") of the character as if the player were the house. In other words, in some embodiments the financial result to the player of the outcome will be in accordance with the typical financial position of the casino. For example, the player will collect the determined wager for a normally losing outcome (e.g., the player's credit balance will be increased), and the player will have to pay out an amount corresponding to a normally winning outcome (e.g., the player's credit balance will be decreased). The character, on the other hand, may be represented as losing the determined wager for a normally losing outcome or receiving a payout amount for a normally winning outcome.

According to various embodiments of the present invention, the player may continue directing a character to make wagers until the player decides to end the gaming session or to go back to playing the gaming device himself in normal payout mode.

In order to make the game experience more entertaining for the player, the virtual player could be displayed in a variety of styles. According to some embodiments, selections of different characters could be presented to the player (e.g., in a displayed menu), and the player may select one of the available characters (e.g., by using a touch screen, by using a pointer device). In one embodiment, the virtual player looks much like a cartoon character, such as the characters typically seen in secondary bonus rounds of slot machines. The character could also be rendered graphically in three dimensions, to provide a more lifelike feel to the character. Some players might enjoy interacting with a virtual player modeled to physically resemble a movie star or famous historical figure, or with a character specifically chosen because of the character's perceived bad luck. To make the experience more entertaining, characters could be programmed to make comments to the player, such as "I'm not feeling very lucky right now" or "Watch out—I feel a hot streak coming!"

An option might be provided to have the virtual player resemble the player himself. Such an option might be appealing to a player who believes his own luck is poor. Images taken by a camera (e.g., built into the gaming device, a surveillance camera) could be used by the gaming device to generate a character resembling the player. In this way, the player may feel as though he is taking the casino position against a representation of his unlucky self.

The displayed character and the virtual gaming device are preferably animated in order to represent the activity of a player playing a gaming device more accurately and/or in a more entertaining way. For example, animation may be used, without limitation, to represent the virtual player pressing a button, making a wager, initiating a spin of one or more reels, selecting one or more paylines, selecting one or more cards to hold and/or discard (e.g., in a video poker game), receiving a payout, reacting to a win, reacting to a loss, interacting with one or more other virtual characters (e.g., purchasing a beverage or other product from a virtual casino employee), and/or consuming food or drink.

As described above, a virtual gaming device is preferably represented graphically for the purposes of simulating play in normal payout mode by the virtual player. Alternatively, a virtual gaming device is not displayed. For example, only a representation of a virtual player may be provided. For instance, the virtual player may be represented at a video display area 138 as observing and reacting to the determined outcome, as displayed using reels 132, 134, and 136 (whether graphical or mechanical) of a slot machine 100.

As described above, video display area 138 may show a graphical representation of a virtual gaming device being played by character. According to some embodiments, at a slot machine the representation of a virtual player may be displayed as if the virtual player is facing the video reels of the slot machine and is "between" the player and the reels. In some embodiments, the virtual player may be depicted as if the player were watching a virtual gaming device "over the shoulder" of the virtual player. In other embodiments, the gaming device may provide a display as if the player is looking through video display area 138 at the face of the character (e.g., as if the player is "in" or "behind" the gaming device and looking out at the virtual player). The player could even be shown a representation of a gaming device "turning around" so that the player felt as if he were taking the position of the casino, for example, after switching to reverse payout mode.

According to one or more embodiments of the present invention, the video display area 138 may be superimposed over one or more of reels 132, 134, and 136. For example, a flat panel video display may be positioned (e.g., mounted to the slot machine 100) in front of the reels 132, 134, and 136 for displaying the virtual player as interacting with the slot machine 100. In another example, a video display may be mounted below the reels 132, 134, and 136 and positioned relative to a partially reflective mirror for projecting an image in front of the reels 132, 134, and 136 between the reels and a player. Thus, an image may be superimposed over the reels 132, 134, and 136 to depict a virtual player playing the slot machine 100.

The displayed virtual gaming device may be a representation of the actual gaming device being played by the player, of a different brand of gaming device, of a gaming device for a different type of game, or any type of device or game, as deemed practicable.

In some embodiments, a player may elect to play in normal payout mode while still playing against one or more virtual players. The virtual players, however, play according to a reverse payout mode. In other words, play by the player during normal payout mode may be depicted as if the player is "the house," and a virtual player is playing in reverse payout mode. For example, CPU 110 of the slot machine 100 may direct play in accordance with a reverse payout table 156, such that the player earns a payout amount when the virtual player is depicted as receiving an outcome that would ordinarily win.

Rather than playing "against" a computer-generated character, according to some embodiments a player may be allowed to take the house position relative to one or more actual players currently on the casino floor. According to such embodiments, the player receives an indication of information about the gaming session(s) of one or more current players (e.g., retrieved from the player database 744 of the slot network server 600). The information may indicate, for example, (i) how many winning outcomes the player has achieved, (ii) how many losing outcomes the player has achieved, (iii) how much the player has wagered, and/or (iv) how much the player has won.

For example, the information may be received by the player at a gaming device, at a kiosk or other terminal, at a casino service desk, via a telephone, via a television channel (e.g., in a casino hotel room), via a pager, or via a handheld wireless device. After reviewing the information, the player then transmits a signal indicating a request to take the house position relative to one or more of the actual players. For example, the player presses a button on his cell phone or gaming device indicating a request to take a position against one or more players and/or indicating another player (or players) he wants to take a position against. The player might be motivated to bankroll the house side against another player if, for example, the player believes that the other player is unlucky (e.g., the other player has a high net loss for the session). Conversely, the player may be motivated to take a reverse mode position from the house's perspective when the player believes another player is lucky (e.g., has a high net win for the session).

In some embodiments, the player need not specify any particular player, but may simply request to take the house position and in response be assigned to one or more actual players (e.g., according to one or more casino criteria, at random).

One or more embodiments of the present invention, as discussed herein, provide for systems and methods that allow for the performance of one or more of the steps of: (i) determining a first player (e.g., a human player); (ii) determining gaming information that is associated with the first player; (iii) transmitting an indication of the gaming information associated with the first player to a second player (e.g., a human player); (iv) receiving from the second player a request to take a position against play of a first gaming device by the first player; (v) determining an amount wagered by the first player; (vi) providing the amount wagered to the second player; and (vii) determining an outcome for the first player.

Some embodiments may also include one or more of the steps of: (i) determining a payout amount associated with the outcome, in which the payout amount is greater than zero; (ii) receiving the payout amount from the second player; (iii) providing the payout amount to the first player; (iv) determining an outcome at the first gaming device; (v) displaying an indication of the outcome at a second gaming device that is associated with the second player; (vi) receiving from the second player a request to take a position against play of a second gaming device by a third player; (vii) transmitting the indication of the gaming information to one or more of a terminal, television, or handheld device; (viii) transmitting an indication of a plurality of players to the second player, the plurality including the first player; and (ix) receiving an indication of a selection by the second player of the first player.

Although some of the above-described embodiments describe the financial result for a player as being the opposite of a result generated for a virtual or real player the player takes a position against, it should be noted that various modifications may be made to ensure that the casino retains a desired edge. In other words, a player playing in reverse mode by taking a position against another player playing in normal mode, may not receive the benefit of the exact same edge that the casino has against someone who is playing in normal mode. According to some embodiments, the casino might decrease some or all of the payments made to the player (e.g., credits paid to the player that represent wagers made by a virtual player).

Alternatively, or in addition, according to some embodiments, payouts made by a player playing in reverse mode (e.g., for a winning outcome achieved by a virtual player) may be increased in order for the house to retain its desired edge over the player. Thus, in some embodiments a real player may be required to pay out more than the house would typically pay out for some or all winning outcomes achieved by a virtual player. For example, if the payout for an outcome of "CHERRY-CHERRY-CHERRY" is twenty coins (e.g., according to a normal payout table), the payout due to a virtual player who achieves the same outcome may be increased to twenty-two coins. In some embodiments, payments made from a player playing in reverse mode to another player (e.g., payouts for a winning outcome) may thus be determined based on a payout table that is a modification of a normal payout table. In light of the present disclosure, those having ordinary skill in the art will readily understand various ways of designing a payout table such that a casino may retain a desirable statistical edge over a player required to make payouts to another player.

Alternatively, or in addition, one or more rules may be established (e.g., stored in a rules database), such as "reduce by 50% any payment to a player that follows a string of three handle pulls in a row that result in a positive net payment to the player." In accordance with such a rule, if a virtual player achieves three losing outcomes in a row, thus giving the real player a positive net payment from the corresponding wagers, the following payment (if any) would be reduced by half. Thus, determining a payment for the player may involve (i) determining if any such rules have been established and/or (ii) determining the payment based on the rule. Similarly, one or more rules may be established for determining the amount a player must pay out to another player who achieves a winning outcome. Other examples of various types of conditions and rules that a gaming device operator (e.g., a casino) may use to retain a desirable statistical edge over a player taking wagers from and/or required to make payouts to another player will be readily apparent to those having ordinary skill in the art in light of the present disclosure.

One or more embodiments of the present invention include an offer being provided to the player for play in reverse payout mode and/or a request by the player to take a position against another (simulated or real) player. In some embodiments, a player may be charged a fee, for example, for a set number of handle pulls (e.g., $20 for twenty-five spins), or a fee per unit time (e.g., $25 for one hour) for this mode of play. In some embodiments, the casino may allow the player to play as the house (and enjoy the benefit of a small statistical edge) as a promotional benefit to the player (e.g., as a reward for past gambling activity).

In accordance with some embodiments, a player may elect to take the house position against a number of virtual and/or actual players simultaneously, with each character/actual player playing a different slot machine (or other gaming device). Of course, this may have the effect of multiplying the player's potential winnings or losses. Several large wins by the other players (whether virtual or actual), however, could result in significant losses to the player. To cover such potential losses, the player may be required to make available a large number of credits (e.g., an escrow account), or to designate at least one alternate sources of funds, such as in the embodiments described with reference to FIGS. 6-11.

Alternatively, or in addition, a player might elect to establish an insurance policy (e.g., by pressing insurance selector 145), as described previously. This insurance policy could be similar to conventional insurance policies in that the player might elect the amount of coverage desired (e.g., how much the policy would pay in the event of a large loss), the deductible amount, the co-pay amount, and/or the duration of coverage. One or more insurance packages may be offered, and the player could select one of the packages.

For example, a player might be offered a package that covers twenty-five handle pulls and reimburses 80% of all losses above ten coins. Alternatively, the player might input parameter values (e.g., coverage, deductible, co-pay, duration) and the gaming device and/or a server could calculate the cost of the premium. Payment of the premium could be made in advance, or on a per-pull basis. Insurance might also be useful for games that include bonus rounds, due to the potentially large payouts that can occur.

In order to make the benefit of insurance more apparent to the player, in some exemplary embodiments the normal payout table 128 governing a gaming session could be altered by the gaming device to reduce those payouts covered by an insurance policy. For example, if a policy were in place that paid 80% of any one hundred coin loss by a player (e.g., in paying out a win by a virtual player), all one hundred coin payouts of normal payout table 128 could be displayed as twenty coins, to illustrate to the player the benefit of the insurance.

According to some alternative embodiments, instead of establishing insurance relationships with players, the gaming device could mitigate the amount of player losses by splitting wins and losses with the player (e.g., on a 50/50 basis). In another example, in order to retain a house edge, the casino might split wins 50/50 and losses 40/60 (i.e., the casino pays 40% and the player pays 60%).

Some alternative embodiments provide for modifying a gaming device (e.g., a video slot machine) in order to allow for a user to take a house position against one or more other (real and/or virtual) players. Gaming devices to be modified may be operable to allow play in accordance with at least one of a normal payout mode and a reverse payout mode. The gaming device is then adapted to be operable to represent play of other players that the user can take a position against. Typically, the play of the other players will be represented as being in a normal mode, but as discussed herein, a user may take a house position against another player playing in a reverse payout mode.

For example, a program for controlling game play at the gaming device may be modified and/or a new program or software module may be made accessible (e.g., via a memory device, via a server) to provide play in accordance with various embodiments described herein. In another example, one or more additional display devices and/or audio output devices may be operatively connected to the gaming device in order to represent play by one or more other players.

As discussed variously herein, some embodiments of the present invention allow for a user of a gaming device to request to take a house position with respect to a game. Methods and systems in accordance with such embodiments may provide for the performing of one or more of the steps of: (i) determining a wager amount; (ii) determining an outcome of the game for a virtual player; (iii) determining a payout amount associated with the outcome; (iv) determining whether the payout amount is greater than zero; and (v) if the payout amount is greater than zero, adjusting an account balance associated with the user based on the payout amount and the wager amount.

As discussed herein, one or more embodiments of the present invention allow for a user of a gaming device to request to have a gaming device operate in a reverse payout mode (e.g., by activating a mode selector). Some methods in accordance with some embodiments may include one or more of the steps of: (i) receiving a request by a user of a gaming device to have the gaming device operate in a reverse payout mode; (ii) displaying a representation of a character operating a gaming device in a normal payout mode; (iii) determining an outcome of a game in accordance with the normal payout mode; and (iv) adjusting an account balance that is associated with the user based on the outcome.

According to some embodiments of the present invention, as discussed herein, systems and methods are provided that allow for one or more of the steps of: (i) receiving a request by a player to play a first gaming device in accordance with a reverse payout mode; (ii) displaying a representation of a second gaming device to the player; (iii) displaying a representation of a character to the player; (iv) receiving an indication of a wager amount from the player; (v) determining an outcome; (vi) displaying a representation of the outcome; (vii) determining a payout amount based on the wager amount and the outcome in accordance with a normal payout mode; and (viii) adjusting a balance that is associated with the player based on the payout amount and the wager amount. Some additional embodiments further provide for one or more of: (i) displaying a representation of the character placing the wager amount at the represented second gaming device; (ii) displaying a representation of the outcome occurring at the represented second gaming device; and (iii) determining the outcome for the character.

According to some embodiments of the present invention, as discussed herein, systems and methods are provided for a gaming device and/or server to perform one or more of the steps of: (i) determining an outcome of a slot machine game, the outcome being associated with a simulated player; (ii) if the outcome is associated with a non-zero payout amount, receiving from a real player an amount that is based on the non-zero payout amount; (iii) determining a wager amount that is associated with the outcome associated with a simulated player; and (iv) providing the wager amount to the real player.

Although the present invention has been described in terms of certain preferred embodiments, other embodiments that are apparent to those of ordinary skill in the art are also intended to be within the scope of the present invention. Accordingly, the scope of the present invention is intended to be limited only by the claims appended hereto.

What is claimed is:

1. A method of operating a gaming system, said method comprising:

(a) causing a processor to execute a plurality of instructions stored in a memory device to operate with a display device and an input device to:
  - (i) receive a request by a player to switch from a normal mode of play to a reverse mode of play;
  - (ii) determine a minimum bankroll amount;
  - (iii) receive at least the minimum bankroll amount from the player, thereby establishing a bankroll amount;
  - (iv) receive an indication from the player of a wager amount; and
  - (v) receive a request by the player to initiate play by a character of a virtual gaming device in the reverse mode; and (b) in response to receiving the request by the player to initiate play by the character in the reverse mode, causing the processor to execute the plurality of instructions to operate with the display device to:

(i) display a representation of play for the character of a the virtual gaming device;

(ii) determine an outcome of play for the character in accordance with a normal mode;

(iii) if the outcome is a winning outcome, decrease the bankroll amount by a payout amount associated with said determined outcome; and (iv) if the outcome is a non-winning outcome, increase the bankroll amount by the wager amount.

2. The method of claim 1, further comprising, in response to the request to initiate play by the character in the reverse mode, causing the processor to execute the plurality of instructions to operate with the display device to display a representation of the character placing the wager amount.

3. A method of operating a gaming system, said method comprising:

(a) causing a processor to execute a plurality of instructions stored in a memory device to operate with a display device and an input device to receive a request by an actual player to switch from a normal mode of play to a reverse mode of play; and (b) in response to receiving the request by the actual player to switch to the reverse mode, causing the processor to execute the plurality of instructions stored in the memory device to operate with the display device and the input device to:

(i) receive an indication of a wager amount;

(ii) upon receiving the indication of the wager amount, display a representation of play for a virtual player playing a virtual slot machine; and (iii) determine an outcome of play for the virtual player in accordance with the normal mode;

(iv) if the outcome is a winning outcome, decrease an account balance associated with the actual player by a payout amount associated with said determined outcome; and (v) if the outcome is a non-winning outcome, increase the account balance associated with the actual player by the wager amount.

4. The method of claim 3, further comprising receiving the indication of the wager amount from the actual player.

* * * * *

UNITED STATES PATENT AND TRADEMARK OFFICE

CERTIFICATE OF CORRECTION

PATENT NO. : 7,862,423 B2
APPLICATION NO. : 12/269129
DATED : January 4, 2011
INVENTOR(S) : Walker et al.

It is certified that error appears in the above-identified patent and that said Letters Patent is hereby corrected as shown below:

IN THE CLAIMS:

In Claim 3, Column 36, Line 9, delete “and”.

Signed and Sealed this
First Day of March, 2011

David J. Kappos
*Director of the United States Patent and Trademark Office*